(12) United States Patent
Ushiro

(10) Patent No.: US 6,826,633 B2
(45) Date of Patent: Nov. 30, 2004

(54) MICROCOMPUTER INCORPORATING PERIPHERAL CIRCUITS

(75) Inventor: Tadahiro Ushiro, Kitakatsuragi-Gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 216 days.

(21) Appl. No.: 10/021,020

(22) Filed: Dec. 19, 2001

(65) Prior Publication Data

US 2002/0083220 A1 Jun. 27, 2002

(30) Foreign Application Priority Data

Dec. 26, 2000 (JP) ........................................ 2000-395170

(51) Int. Cl.⁷ .............................................. G06F 13/00
(52) U.S. Cl. ......................................... 710/12; 710/316
(58) Field of Search .............................. 710/1–4, 8–14, 710/31–32, 51, 62–64, 305, 312, 313–317, 260, 268; 709/327

(56) References Cited

U.S. PATENT DOCUMENTS

| | | | | |
|---|---|---|---|---|
| 4,322,794 A | * | 3/1982 | Kurakake | 710/305 |
| 4,654,820 A | * | 3/1987 | Brahm et al. | 710/260 |
| 5,111,423 A | * | 5/1992 | Kopec et al. | 710/9 |
| 5,142,625 A | | 8/1992 | Nakai | |
| 5,619,706 A | * | 4/1997 | Young | 710/268 |
| 5,630,174 A | * | 5/1997 | Stone et al. | 710/63 |
| 5,854,908 A | * | 12/1998 | Ogilvie et al. | 710/312 |
| 5,933,656 A | * | 8/1999 | Hansen | 710/62 |
| 6,044,411 A | * | 3/2000 | Berglund et al. | 710/9 |
| 6,145,020 A | | 11/2000 | Barnett | |
| 6,263,378 B1 | * | 7/2001 | Rudoff et al. | 709/327 |
| 6,510,473 B1 | * | 1/2003 | Voit | 710/58 |

FOREIGN PATENT DOCUMENTS

| | | |
|---|---|---|
| CN | 1076532 A | 9/1993 |
| EP | 0 306 962 A2 | 3/1989 |
| JP | 04-361334 A | 12/1992 |
| JP | 05-127913 | 5/1993 |

* cited by examiner

*Primary Examiner*—Christopher B. Shin
(74) *Attorney, Agent, or Firm*—Birch, Stewart, Kolasch & Birch, LLP.

(57) ABSTRACT

A microcomputer including a plurality of peripheral circuits has a connecting circuit that permits the interconnection among those peripheral circuits to be controlled through execution of a program. This makes it possible to realize intelligent peripheral circuit functions, such as are associated rather with a special-purpose microcomputer than with a general-purpose microcomputer, without using special manufacturing techniques or processes or spending a long time as in the development of a special-purpose microcomputer.

7 Claims, 23 Drawing Sheets

Fig. 8
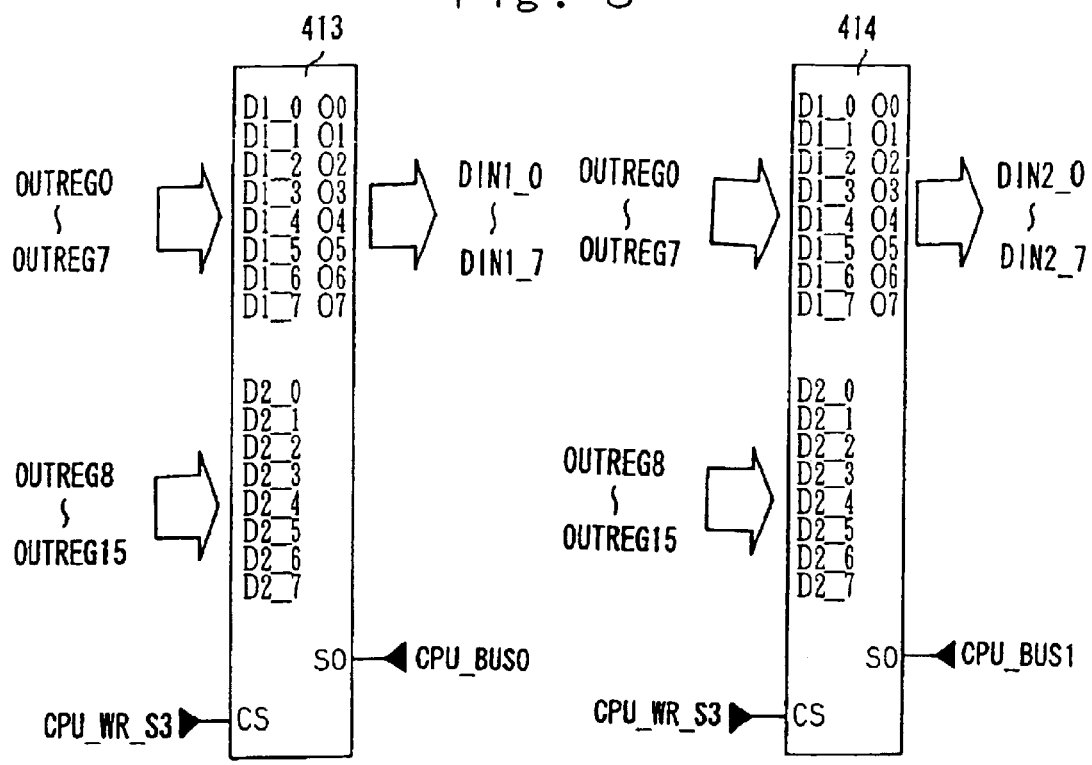
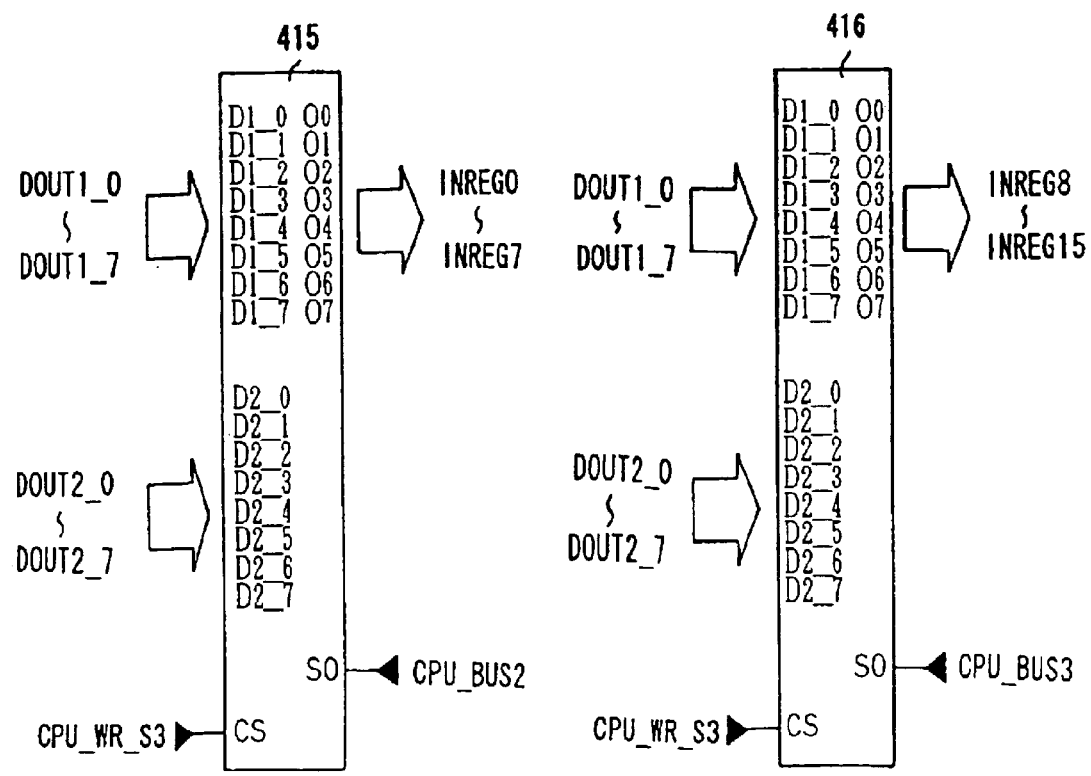

Fig. 9

| S2 | S1 | S0 | OUT |
|----|----|----|-----|
| 0  | 0  | 0  | D0  |
| 0  | 0  | 1  | D1  |
| 0  | 1  | 0  | D2  |
| 0  | 1  | 1  | D3  |
| 1  | 0  | 0  | D4  |
| 1  | 0  | 1  | D5  |
| 1  | 1  | 0  | —   |
| 1  | 1  | 1  | —   |

MICROCOMPUTER INCORPORATING PERIPHERAL CIRCUITS

BACKGROUND OF THE INVENTION

1. Field of the Invention

The present invention relates to a microcomputer provided with a plurality of peripheral circuits.

2. Description of the Prior Art

A microcomputer is composed of a central processing unit (CPU) and various peripheral circuits such as data and program memories, I/O ports, and timer-counters. Microcomputers are classified into special-purpose and general-purpose models, of which special-purpose models are often called ASICs (application-specific integrated circuits).

With a special-purpose microcomputer, its peripheral circuits are designed according to a specific application, and therefore efficient processing performance can be expected. On the other hand, its newly designed portion requires extra development time, which sometimes makes it impossible to develop such a microcomputer in time for the development of the device in which the microcomputer is to be incorporated when its development schedule is tight.

A general-purpose microcomputer is designed to cope with a wide range of applications, and is therefore provided with various functions. However, those functions and their performance do not always satisfy the specifications required in a specific application. Therefore, it is necessary, first of all, to select a model that satisfies the desired specifications. However, it is difficult to judge whether a given model is provided with functions that satisfy the desired specifications or not, and improper selection of a model might invite, in the middle of the designing of a program, change of the model of the microcomputer to be used or alterations to the specifications of the application. In either way, improper selection of a model of a microcomputer leads to a delay in the development of an application.

A general-purpose microcomputer is so devised as to achieve intelligent functions through interlocked operation of a plurality of peripheral circuits. For example, there is known a function called "input capture," which is realized through interlocked operation of a timer-counter and an I/O port.

This function permits the count value of a timer to be stored in a special-purpose register every time a rising or trailing edge is detected in an external input signal. Thus, this function is useful in measuring the period for which an external input signal remains at a high or low level.

Now, how the periods of an external input signal are measured will be described with reference to FIG. 21, taking up as an example a case in which a timer is operating on a system clock having a frequency of 4 [MHz] and, as an external input signal, a pulse is fed in that remains for 1.5 [μs] at a high level and for 0.5 [μs] at a low level. Every time the external input signal EXT_IN rises or falls, the count value T of the timer is stored in a special-purpose register R, then the count value T is reset, and then the timer start counting again.

Moreover, every time the external input signal EXT_IN rises or falls, an interrupt request occurs. In the software procedure, of which a flow chart is shown in FIG. 22, executed when an interrupt request has occurred due to the external input signal EXT_IN, first, whether the cause for the interrupt request is a rising edge in the external input signal EXT_IN or not is checked (S801).

If the cause is a rising edge in the external input signal EXT_IN ("Yes" in S801), the value in the register R is saved as the period (hereinafter the "low period") for which the external input signal EXT_IN remains at a low level (S802). If not ("No" in S801), the value in the register R is saved as the period (hereinafter the "high period") for which the external input signal EXT_IN remains at a high level (S803).

Here, the count value of the timer is written repeatedly to the same register, and therefore it is necessary, before the register is overwritten with a new value, to save the value in the register. In the example under discussion, only 0.5 [μs] is available for the saving of the high period of the external input signal. This corresponds to two states in a CPU that operates on a system clock having a frequency of 4 [MHz], and, within two states, it can be impossible to jump to the address of and complete the execution of the software interrupt procedure.

In this case, to make the measurement possible, it is necessary to use two input capture functions. Specifically, the signal to be measured are input to two I/O ports each having an input capture functions, and two timers are used to measure two separate times. This will be described with reference to FIG. 23.

On every rising or trailing edge in the external input signal EXT_IN1 fed to it, one input capture function stores the count value T1 of one timer in a register R1, then the count value T1 is reset, and then the timer start counting again. On every trailing edge in the external input signal EXT_IN2 fed to it, the other input capture function stores the count value T2 of the other timer in a register R2, then the count value T2 is reset, and then the timer start counting again.

Moreover, on every rising or trailing edge in the external input signal EXT_IN1 and on every trailing edge in the external input signal EXT_IN2, an interrupt request occurs. Flow charts of the software procedure executed on occurrence of an interrupt request is shown in FIGS. 24 and 25.

When an interrupt request has occurred due to the external input signal EXT_IN1, if the cause of the interrupt request is a rising edge in the external input signal EXT_IN1 ("Yes" in S901), the value in the corresponding register R1 is saved as the low period (S902). On the other hand, when an interrupt request has occurred due to the external input signal EXT_IN2, the value calculated by subtracting the low period saved in the register R1 from the value in the corresponding register R2 is saved as the high period (S1001).

However, in this method, an extra I/O port needs to be used in addition to an extra timer. Moreover, in a special-purpose microcomputer, a signal from a single terminal can be fed to different circuit blocks. More important, it takes long for a programmer to hit upon this method.

Even if a programmer hits upon this method, an extra I/O port having an input capture function needs to be free. In the course of the development of a device in which a microcomputer is to be incorporated, when the development of a program for the microcomputer is underway, the design of the circuitry including the microcomputer has, in most cases, already been determined.

For these reasons, if an alteration becomes necessary in the allocation for use of I/O ports having special functions in the middle of the designing of the program for the microcomputer, it may affect the development schedule of the device as a whole. Moreover, it is questionable whether one can foresee, at the stage of the selection of the model of the microcomputer, that the measurement of a single signal will require as many as two I/O ports having such special functions.

In this way, in a case where a general-purpose microcomputer is incorporated in a device including specialized operation, unexpected problems are likely to arise, which often leads to a delay in the development of the device as a whole.

In a situation where sufficient time for the development of a special-purpose microcomputer is not available, and in addition it is difficult to judge whether the peripheral circuit functions of a general-purpose microcomputer satisfy the specifications of the device as an end product or not, it is possible, as disclosed in Japanese Patent Application Laid-Open No. H5-127913, to develop simultaneously the desired peripheral circuit functions and the desired program by the use of a programmable gate array.

However, precisely because of the principles on which a programmable gate array is based, using one to realize peripheral circuit functions results in a larger circuit area than otherwise. Moreover, necessary peripheral circuit functions are unknown beforehand, and therefore it is necessary to secure an extra number of gates. This leads to a higher cost than a special-purpose microcomputer. Furthermore, the manufacture of a programmable gate array requires a special process, and therefore forming it together with other devices on a single chip requires special techniques. Thus, no such process has come into practical use to date with microcomputers for incorporation in devices.

As described above, a special-purpose microcomputer requires long development time. On the other hand, with a general-purpose microcomputer, it is difficult to judge whether it is provided with peripheral circuit functions that satisfy the specifications of the device in which it is to be incorporated. Thus, if it is found, in the middle of the development of the program, that the general-purpose microcomputer does not satisfy the specifications of the device, it is inevitable to change the model of the general-purpose microcomputer or alter the specifications of the device.

Even if a programmer hits upon a method of satisfying the specifications required by the device by the use of the limited peripheral circuit functions of the general-purpose microcomputer, it cannot always be realized by programming alone and may need alterations in the circuitry of the device as a whole. Moreover, it takes long for the programmer to hit upon such a special solution. In either way, a delay is risked in the development schedule of the device as a whole.

Moreover, in the designing of the device, from the viewpoint of its manufacturing cost, the choice of the model of the general-purpose microcomputer is in most cases limited. Nevertheless, in a case where a model that satisfies the specifications required by the device is available only in a higher price range, there is no choice but to use that model. This leads to a higher cost.

SUMMARY OF THE INVENTION

An object of the present invention is to provide a microcomputer having intelligent peripheral circuit functions, such as are associated rather with a special-purpose microcomputer than with a general-purpose microcomputer, without using special manufacturing techniques or processes or spending a long time as in the development of a special-purpose microcomputer.

To achieve the above object, according to the present invention, a microcomputer including a plurality of peripheral circuits is provided with a connecting circuit that permits the interconnection among those peripheral circuits to be controlled through execution of a program.

In this configuration, by interconnecting the individual, basic peripheral circuits with the connecting circuit through execution of a program, it is possible to realize intelligent functions such as are not realized by those individual, basic peripheral circuits on their own. This makes it possible to avoid inviting a higher cost by having to select a model having an excess of functions as in a case where a general-purpose microcomputer is used. Moreover, as long as basic peripheral circuits that are expected to be necessary are incorporated in a microcomputer, there is no need to design the peripheral circuits in detail. This helps shorten the development time of the device as a whole in which the microcomputer is to be incorporated. Furthermore, whereas, in a microcomputer provided with specialized peripheral circuits, the development of a software program requires a bread board, a microcomputer according to the present invention permits its peripheral circuits to be determined at the time of the debugging of the software program. This also contributes to the shortening of the development time.

In short, with a microcomputer according to the present invention, it is possible to realize intelligent peripheral circuit functions, such as are associated rather with a special-purpose microcomputer than with a general-purpose microcomputer, without using special manufacturing techniques or processes or spending a long time as in the development of a special-purpose microcomputer. Moreover, it is possible to alter the peripheral circuits at the time of the designing of the software program so that they offer higher efficiency.

BRIEF DESCRIPTION OF THE DRAWINGS

This and other objects and features of the present invention will become clear from the following description, taken in conjunction with the preferred embodiments with reference to the accompanying drawings in which:

FIG. 8 is a diagram showing the other selectors constituting the connecting circuit;

FIG. 9 is a diagram showing the relationship between the states of the signals fed to the terminals of the selectors shown in FIG. 7 and the selected terminals;

DESCRIPTION OF THE PREFERRED EMBODIMENTS

Figure 1:
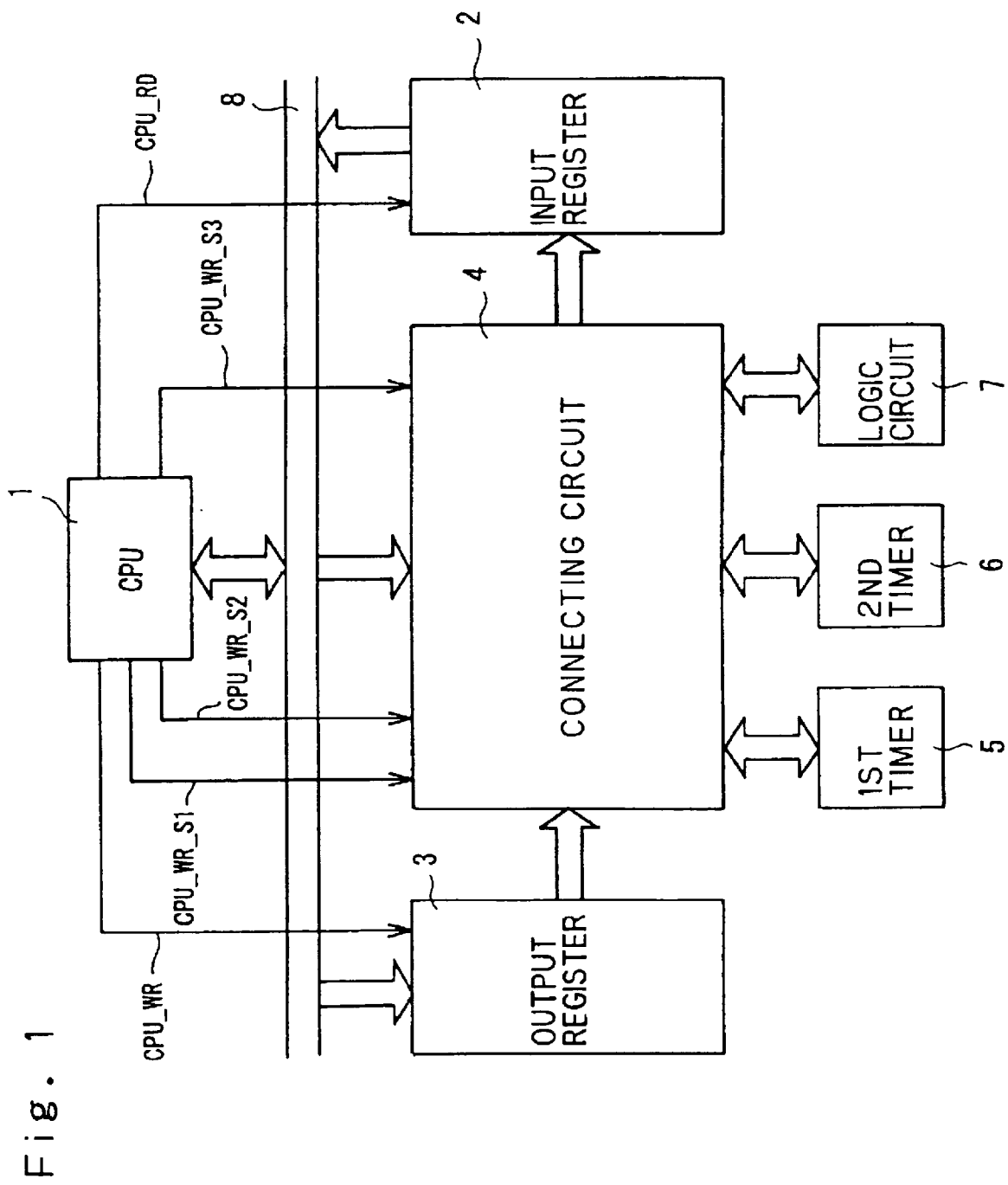
FIG. 1 is a block diagram of a microcomputer embodying the present invention.

Hereinafter, an embodiment of the present invention will be described with reference to the drawings. FIG. 1 is a block diagram of a microcomputer embodying the invention. In this figure, reference numeral 1 represents a CPU, reference numeral 2 represents an input register, reference numeral 3 represents an output register, reference numeral 4 represents a connecting circuit, reference numeral 5 represents a first timer, reference numeral 6 represents a second timer, reference numeral 7 represents a logic circuit, and reference numeral 8 represents a data bus.

Figure 2:
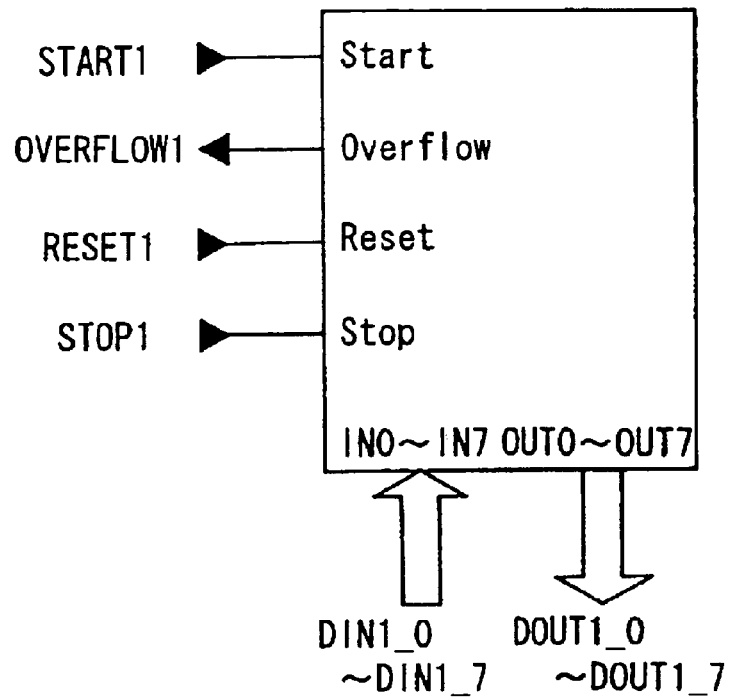
FIG. 2 is a diagram showing the down counter constituting the first timer.
Figure 3:
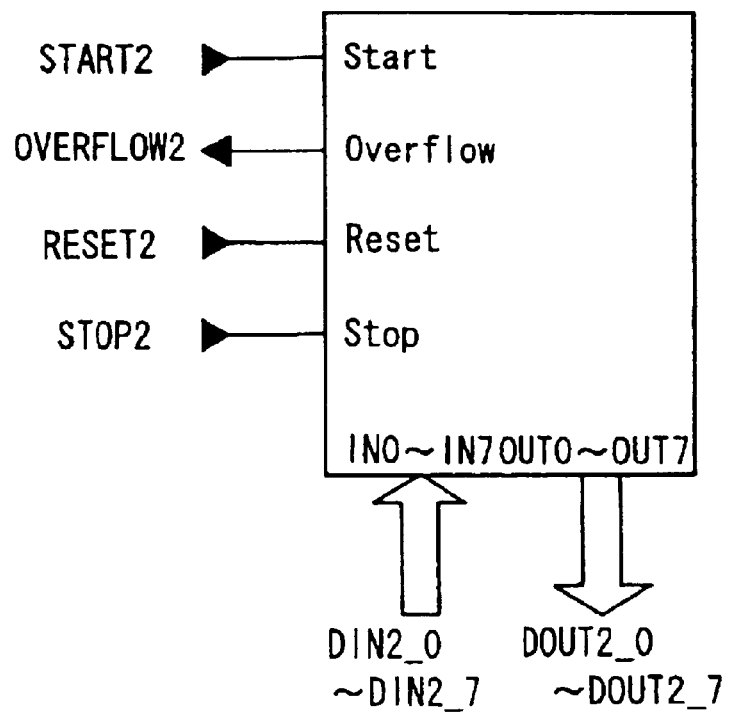
FIG. 3 is a diagram showing the down counter constituting the second timer.

As FIGS. 2 and 3 show, the first and second timers 5 and 6, which are peripheral circuits, are each composed of a down counter. The down counter operates in the following manner.

The count value is decremented by one at a time in synchronism with a clock signal (not shown). Counting is started on the rising edge of the input to the terminal "Start," and is stopped on the rising edge of the input to the terminal "Stop." From the terminals OUT0 to OUT7 are output 8-bit signals representing the current count value. When an overflow occurs in the count value (i.e. when the count value becomes equal to 00(Hex)), the output from the terminal "Overflow" turns to a high level. In the present specification, (Hex) denotes a hexadecimal number.

On a rising edge in the input to the terminal "Reset," resetting is performed. Specifically, the count value is set to be equal to the value represented by the 8-bit signals input to the terminals IN0 to IN7, and the output from the terminal "Overflow" is turned to a low level. Moreover, as long as the input to the terminal "Reset" remains at a high level, the input to the terminal "Start" is ignored (i.e. even when a rising edge appears in the input to the terminal "Start," counting is not started).

In this embodiment are provided a circuit that issues an interrupt request when an overflow occurs in the first timer 5 and a circuit that issues an interrupt request when an overflow occurs in the second timer 6.

Figure 4:
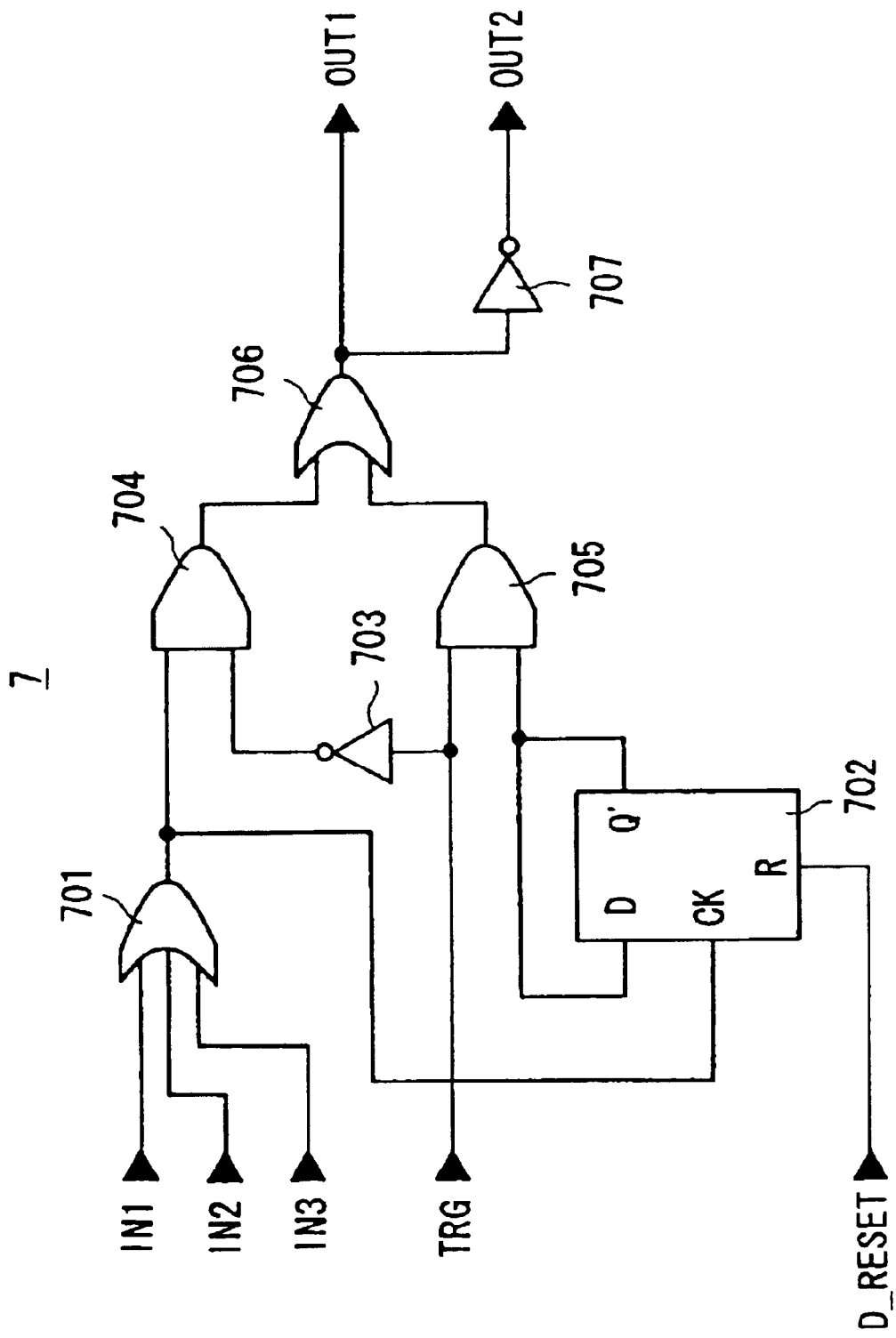
FIG. 4 is a diagram showing the configuration of the logic circuit.

As FIG. 4 shows, the logic circuit 7, which is one of the basic components of peripheral circuits, is composed of a three-input OR gate 701, a flip-flop 702, an inverter 703, an AND gate 704, an AND gate 705, an OR gate 706, and an inverter 707.

The OR gate 701 receives input signals IN1, IN2, and IN3. The flip-flop 702 receives, at its data terminal D, the signal output from its own inverting terminal Q', receives, at its clock terminal CK, the signal output from the OR gate 701, and receives, at its reset terminal R, an input signal D_RESET. The inverter 703 receives an input signal TRG.

The AND gate 704 receives the signal output from the OR gate 701 and the signal output from the inverter 703. The AND gate 705 receives the input signal TRG and the signal output from the inverting terminal Q' of the flip-flop 702.

The OR gate 706 receives the signal output from the AND gate 704 and the signal output from the AND gate 705. The signal output from the OR gate 706 is output as an output signal OUT1, and is also output through the inverter 707 as an output signal OUT2.

In the logic circuit 7 configured as described above, when the input signal TRG is at a low level, the output signals OUT1 and OUT2 reflect the signal output from the OR gate 701. Specifically, if any of the input signals IN1, IN2, and IN3 is at a high level, the output signal OUT1 is at a high level, and the output signal OUT2 is at a low level; if all of the input signals IN1, IN2, and IN3 are at a high level, the output signal OUT1 is at a low level, and the output signal OUT2 is at a high level.

By contrast, when the input signal TRG is at a high level, if the input signal D_RESET is at a high level, the output signal OUT1 is at a high level, and the output signal OUT2 is at a low level; if the input signal D_RESET is at a low level, the output signals OUT1 and OUT2 are inverted every time any of the input signals IN1, IN2, and IN3 turns to a high level from a state in which all of them are at a low level.

Figure 5:
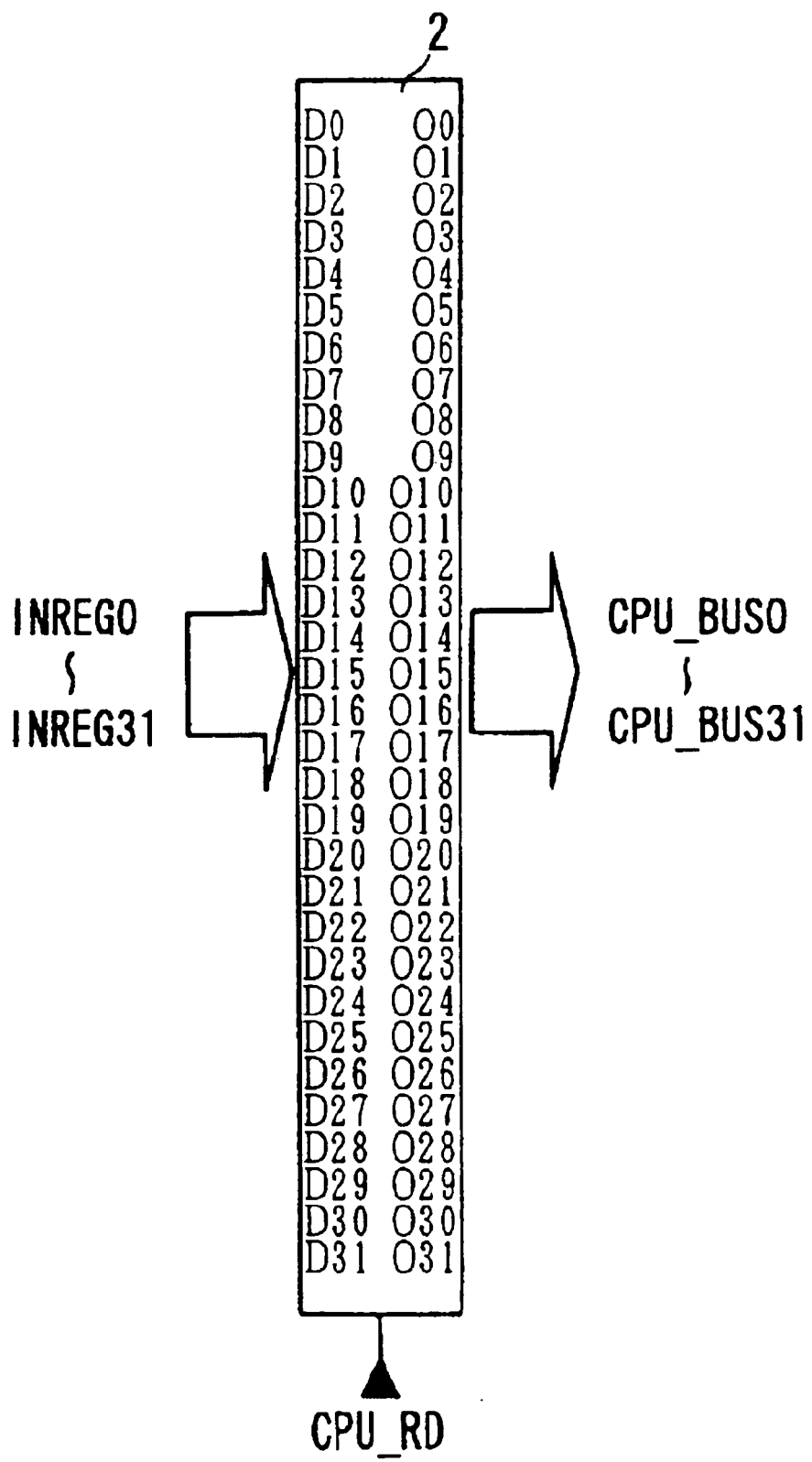
FIG. 5 is a diagram showing the latch circuit constituting the input register.

As FIG. 5 shows, the input register 2, which is a peripheral circuit, is composed of a 32-bit latch circuit. The input register 2 reads the values of the 32-bit signals INREG0 to INREG31 input to its terminals D0 to D31 in synchronism with the clock signal (not shown), and outputs the most recently read values of those signals INREG0 to INREG31 from its output terminals O0 to O31 to the data bus 8 when the signal CPU_RD that is output from an address decoder when the CPU 1 is going to read from a predetermined particular address is at a high level. Specifically, when the signal CPU_RD is at a high level, the values of the 32-bit signals CPU_BUS0 to CPU_BUS31 on the data bus 8 become equal to the values of the signals INREG0 to INREG31 most recently read by the input register 2.

The input register 2 is assigned an address F0000000 (Hex) as a memory region of the CPU 1. When the CPU 1 makes read access to this assigned address in a program, the signal CPU_RD turns to a high level.

Figure 6:
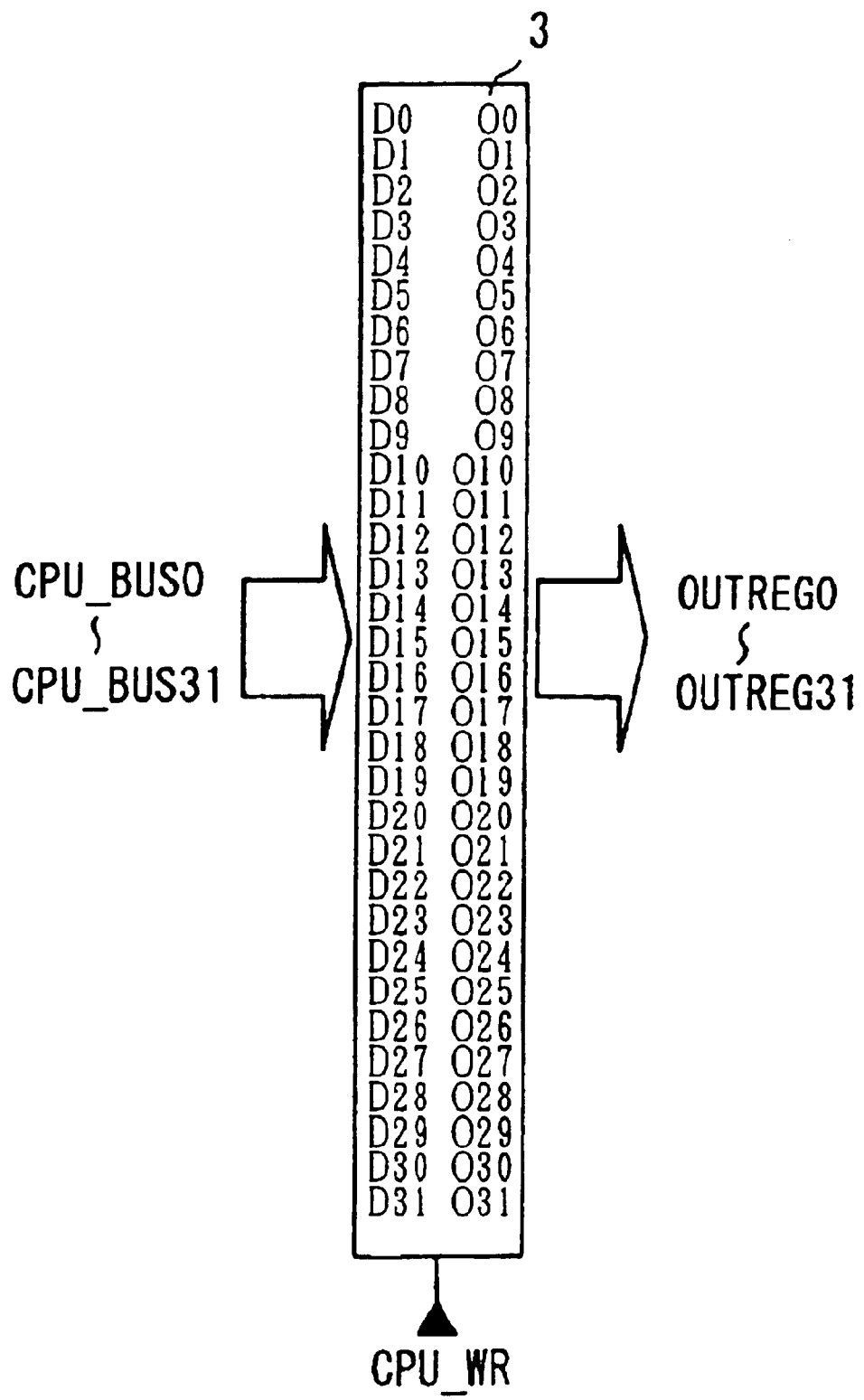
FIG. 6 is a diagram showing the latch circuit constituting the output register.

As FIG. 6 shows, the output register 3, which is a peripheral circuit, is composed of a 32-bit latch circuit. When the signal CPU_WR that is output from the address decoder when the CPU 1 is going to write to a predetermined particular address is at a high level, the output register 3 reads the values of the 32-bit signals CPU_BUS0 to CPU_BUS31 on the data bus 8 via its terminals D0 to D31 in synchronism with the clock signal (not shown), and outputs the most recently read values thereof from its output terminals O0 to O31. The 32-bit signals OUTREG0 to OUTREG31 output from the terminals O0 to O31 of the output register 3 are input to the connecting circuit 4.

The output register 3 is assigned an address F0000004 (Hex) as a memory region of the CPU 1. When the CPU 1 makes write access to this assigned address in a program, the signal CPU_WR turns to a high level. When the signal CPU_WR is at a low level, the signals OUTREG0 to OUTREG31 output from the terminals O0 to O31 of the output register 3 are kept unchanged.

Figure 7:
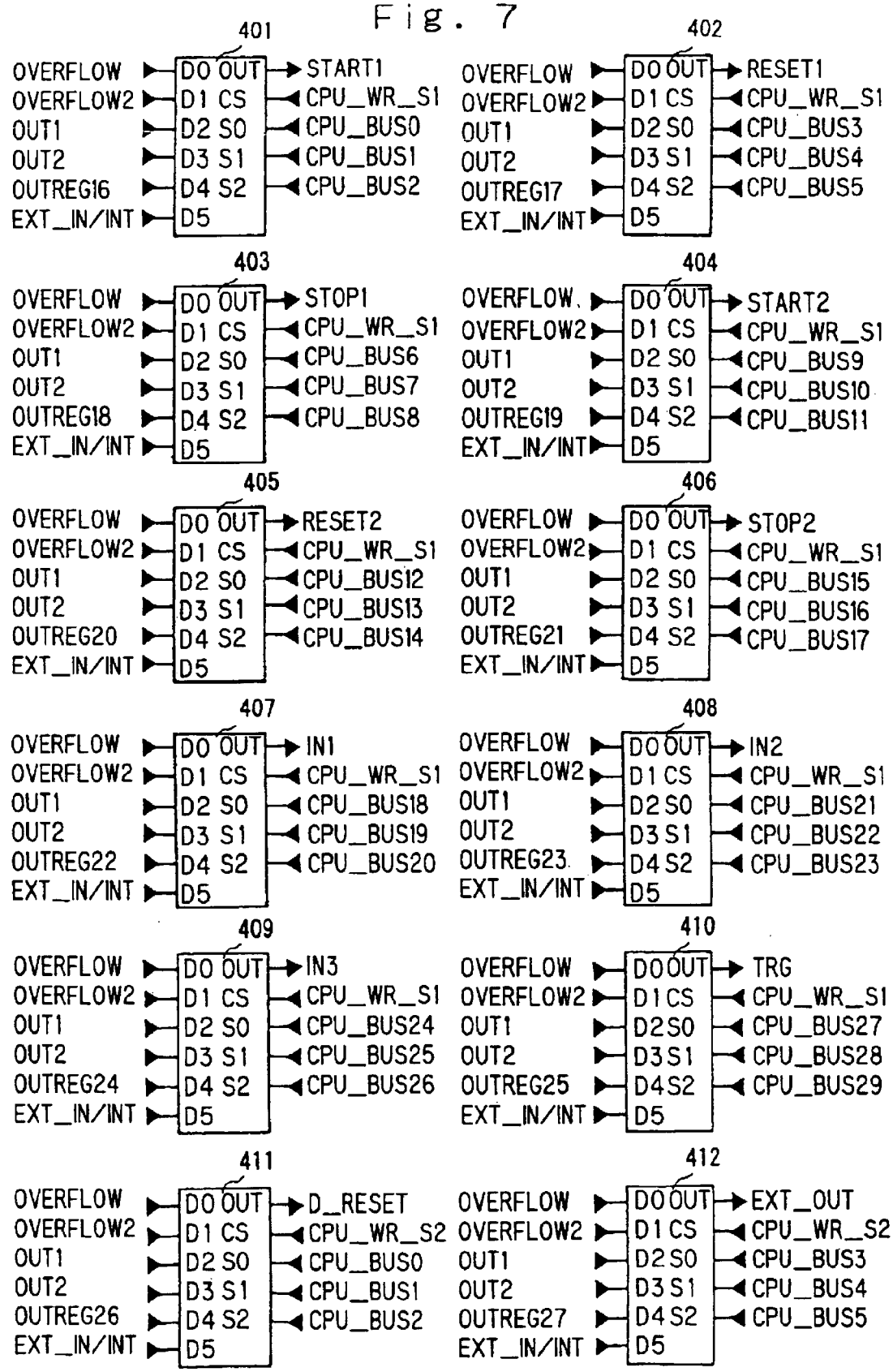
FIG. 7 is a diagram showing part of the selectors constituting the connecting circuit.

The connecting circuit 4 is composed of selectors 401 to 412, shown in FIG. 7, and selectors 413 to 416, shown in FIG. 8. In each of the selectors 401 to 412, according to the states of the signals input to terminals S0, S1, and S2, one of terminals D0, D1, D2, D3, D4, and D5 is selected, and the signal input to the selected terminal is output from a terminal OUT. FIG. 9 shows the relationship between the states of the signals input to the terminals S0, S1, and S2 and the selected terminal. In this figure, "1" represents a high level, and "0" represents a low level.

However, if the signal input to the terminal CS is at a low level, even when the states of the signals input to the terminals S0, S1, and S2 change, the selection from among the terminals D0, D1, D2, D3, D4, and D5 is kept unchanged. In other words, the signal output from the terminal OUT is kept unchanged.

Each of the selectors 401 to 412 receives, at its terminals D0, D1, D2, D3, and D5 respectively, the signal OVERFLOW1 output from the terminal "Overflow" of the first timer 5, the signal OVERFLOW2 output from the terminal "Overflow" of the second timer 6, the output signals OUT1 and OUT2 of the logic circuit 7, and an interrupt-causing external input signal EXT_IN/INT that is fed in from outside the microcomputer. Here, an interrupt-causing external input signal denotes a signal of which rising and trailing edges cause interrupt requests in the circuit to which it is fed.

The selectors 401, 402, . . . , and 412 respectively receive, at their terminals D4, the signal OUTREG16 output from the terminal O16 of the output register 3, the signal OUTREG17 output from the terminal O17 thereof, . . . , and the signal OUTREG27 output from the terminal O27 thereof.

The selector 401 receives, at its terminals S0, S1, and S2 respectively, the signals CPU_BUS0, CPU_BUS1, and CPU_BUS2 on the data bus 8. The selector 402 receives, at its terminals S0, S1, and S2 respectively, the signals CPU_BUS3, CPU_BUS4, and CPU_BUS5 on the data bus 8.

The selector 403 receives, at its terminals S0, S1, and S2 respectively, the signals CPU_BUS6, CPU_BUS7, and CPU_BUS8 on the data bus 8. The selector 404 receives, at its terminals S0, S1, and S2 respectively, the signals CPU_BUS9, CPU_BUS10, and CPU_BUS11 on the data bus 8.

The selector 405 receives, at its terminals S0, S1, and S2 respectively, the signals CPU_BUS12, CPU_BUS13, and CPU_BUS14 on the data bus 8. The selector 406 receives, at its terminals S0, S1, and S2 respectively, the signals CPU_BUS15, CPU_BUS16, and CPU_BUS17 on the data bus 8.

The selector 407 receives, at its terminals S0, S1, and S2 respectively, the signals CPU_BUS18, CPU_BUS19, and CPU_BUS20 on the data bus 8. The selector 408 receives, at its terminals S0, S1, and S2 respectively, the signals CPU_BUS21, CPU_BUS22, and CPU_BUS23 on the data bus 8.

The selector 409 receives, at its terminals S0, S1, and S2 respectively, the signals CPU_BUS24, CPU_BUS25, and CPU_BUS26 on the data bus 8. The selector 410 receives, at its terminals S0, S1, and S2 respectively, the signals $CPU_{13}$ BUS27, $CPU_{13}$ BUS28, and CPU_BUS29 on the data bus 8.

The selector 411 receives, at its terminals S0, S1, and S2 respectively, the signals CPU_BUS0, CPU_BUS1, and CPU_BUS2 on the data bus 8. The selector 412 receives, at its terminals S0, S1, and S2 respectively, the signals CPU_BUS3, CPU_BUS4, and CPU_BUS5 on the data bus 8.

The selectors 401 to 410 all receive, at their terminals CS, the signal CPU_WR_S1 output from the address decoder of the CPU 1. The selectors 411 and 412 both receive, at their terminals CS, the signal CPU_WR_S2 output from the address decoder of the CPU 1.

The selectors 401 to 410 are assigned an address F0000008(Hex) as a memory region of the CPU 1. When the CPU 1 makes write access to this assigned address in a program, the signal CPU_WR_S1 turns to a high level.

The selectors 411 and 412 are assigned an address F000000C(Hex) as a memory region of the CPU 1. When the CPU 1 makes write access to this assigned address in a program, the signal CPU_WR_S2 turns to a high level.

The signal output from the terminal OUT of the selector 401 is used as a signal START1 that is input to the terminal "Start" of the first timer 5. The signal output from the terminal OUT of the selector 402 is used as a signal RESET1 that is input to the terminal "Reset" of the first timer 5. The signal output from the terminal OUT of the selector 403 is used as a signal STOP1 that is input to the terminal "Stop" of the first timer 5.

The signal output from the terminal OUT of the selector 404 is used as a signal START2 that is input to the terminal "Start" of the second timer 6. The signal output from the terminal OUT of the selector 405 is used as a signal RESET2 that is input to the terminal "Reset" of the second timer 6. The signal output from the terminal OUT of the selector 406 is used as a signal STOP2 that is input to the terminal "Stop" of the second timer 6.

The signals output from the terminals OUT of the selectors 407, 408, 409, 410, and 411 are used respectively as the input signals IN1, IN2, IN3, TRG, and D_RESET to the logic circuit 7. The signal output from the terminal OUT of the selector 412 is used as a signal EXT_OUT that is fed out of the microcomputer.

Each of the selectors 413 to 416 chooses, according to the state of the signal input to its terminal S0, between the combination of its terminals D1_0, D1_1, . . . , and D1_7 and the combination of its terminals D2_0, D2_1, . . . , and D2_7, and outputs the 8-bit signals input to the chosen combination of the terminals from its output terminals O0 to O7.

Specifically, when the signal fed to the terminal S0 is at a low level, the combination of the terminals $D1_{13}$ 0, D1_1, . . . , and D1_7 is chosen, and, when the signal fed to the terminal S0 is at a high level, the combination of its terminals D2_0, D2_1, . . . , and $D2_{13}$ 7 is chosen. If the signal input to the terminal CS is at a low level, even when the state of the signal input to the terminal S0 changes, the choice between the two combination of the terminals is kept unchanged. In other words, the signals output from the terminals O0 to O7 are kept unchanged.

The selectors 413 and 414 receive, at their terminals D1_0, D1_1, . . . D1_7, D2_0, D2_1, . . . , and D2_7, respectively, the lower 16-bit signals OUTREG0, OUTREG1, ..., OUTREG7, OUTREG8, OUTREG9, ..., and OUTREG15 output from the output register 3.

The selectors 415 and 416 each receive, at their terminals D1_0 to D1_7 respectively, the 8-bit signals DOUT1_0 to DOUT1$_{13}$_7 output from the output terminals OUT0 to OUT7 of the first timer 5 and, at their terminals D2_0 to D2_7 respectively, the 8-bit signals DOUT2_0 to DOUT2_7 output from the output terminals OUT0 to OUT7 of the second timer 6.

The selectors 413, 414, 415, and 416 respectively receive, at their terminals S0, the signals CPU_BUS0, CPU_BUS1, CPU_BUS2, and CPU_BUS3 on the data bus 8.

The selectors 413 to 416 all receive, at their terminals CS, a signal CPU_WR_S3 output from the address decoder of the CPU 1. The selectors 413 to 416 are assigned an address F0000010 (Hex) as a memory region of the CPU 1. When the CPU 1 makes write access to this assigned address in a program, the signal CPU_WR_S3 turns to a high level.

The signals output from the terminals O0 to O7 of the selector 413 are used as signals DIN1_0 to DIN1_7 that are input to the terminals IN0 to IN7 of the first timer 5. The signals output from the terminals O0 to O7 of the selector 414 are used as signals DIN2_0 to DIN2_7 that are input to the terminals IN0 to IN7 of the second timer 6.

The signals output from the terminals O0 to O7 of the selector 415 are used as signals INREG0 to INREG7 that are input to the terminals D0 to D7 of the input register 2. The signals output from the terminals O0 to O7 of the selector 416 are used as signals INREG8 to INREG15 that are input to the terminals D8 to D15 of the input register 2.

A program uses 32-bit registers Reg0 to Reg31 (not shown) to achieve input from and output to the data bus 8. Specifically, the signal CPU_BUS0 on the data bus 8 turns to a high level when the bit in the register Reg0 is turned to "1," and turns to a low level when the register Reg0 is turned to "0." The value in the register Reg0 is "1" if evaluated when the signal CPU_BUS0 on the data bus 8 is at a high level, and is "0" if evaluated when the signal CPU_BUS0 on the data bus 8 is at a low level. The same relationship applies between the register Reg1 and the signal CPU_BUS1 on the data bus 8, between the register Reg2 and the signal CPU_BUS2 on the data bus 8, ..., and between the register Reg31 and the signal CPU_BUS31 on the data bus 8.

Figure 10:
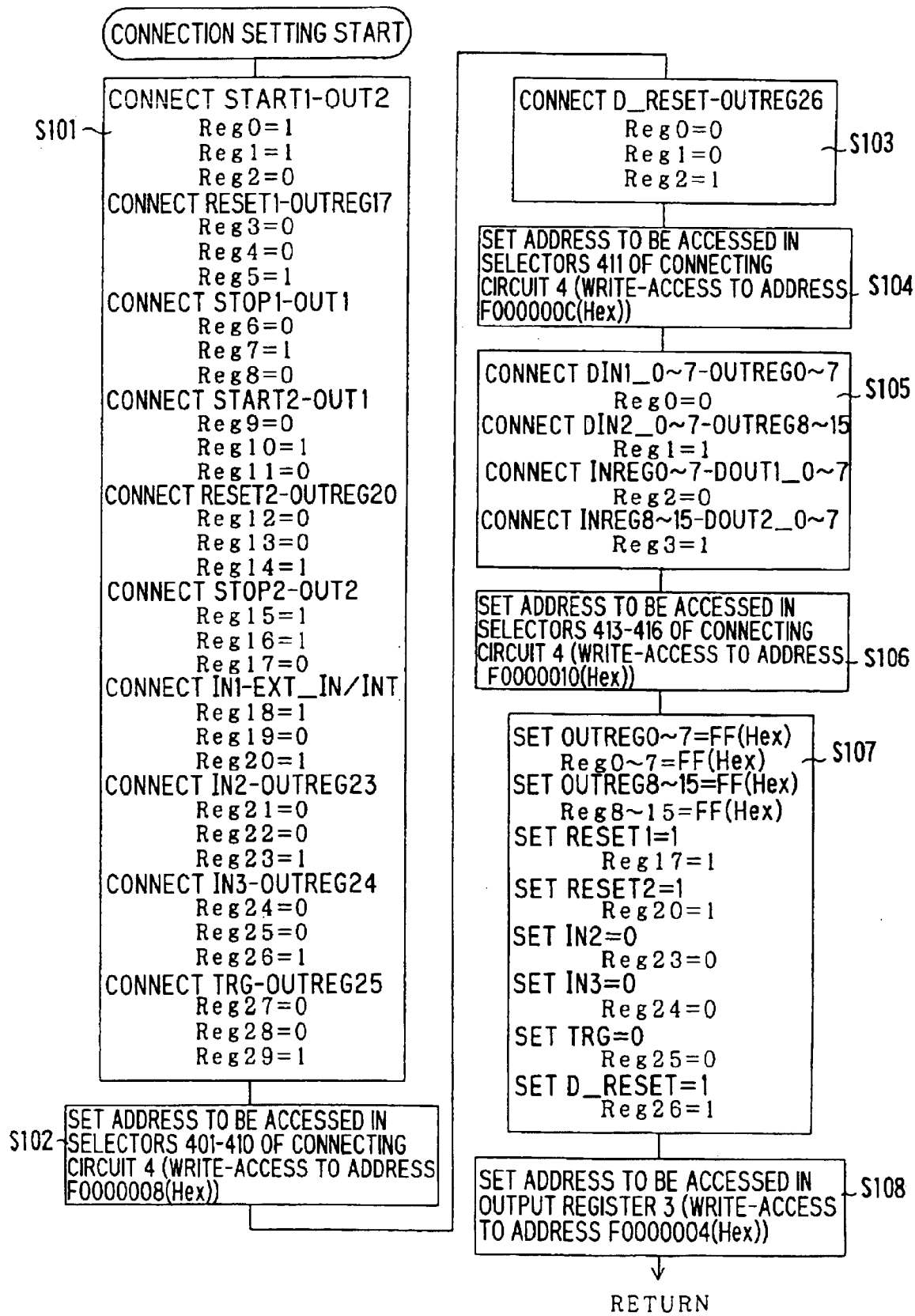
FIG. 10 is a flow chart of an example of a program for building peripheral circuits having predetermined functions.

FIG. 10 shows a flow chart of an example of the program for building peripheral circuits having predetermined functions. First, the registers Reg0 to Reg29 are set as follows: Reg0=1, Reg1=1, Reg2=0, Reg3=0, Reg4=0, Reg5=1, Reg6=0, Reg7=1, Reg8=0, Reg9=0, Reg10=1, Reg11=0, Reg12=0, Reg13=0, Reg14=1, Reg15=1, Reg16=1, Reg17=0, Reg18=1, Reg19=0, Reg20=1, Reg21=0, Reg22=0, Reg23=1, Reg24=0, Reg25=0, Reg26=1, Reg27=0, Reg28=0, and Reg29=1 (S101).

Next, the address to which to make access is set in the selectors 401 to 410 of the connecting circuit 4. Specifically, write access is made to the address F0000008(Hex) (S102). This turns the signal CPU_WR_S1 input to the terminals CS of the selectors 401 to 410 to a high level, and thus switches the signals selected by the selectors 401 to 410.

Next, the registers Reg0 to Reg2 are set as follows: Reg0=0, Reg1=0, and Reg2=1 (S103). Next, the address to which to make access is set in the selector 411 of the connecting circuit 4. Specifically, write access is made to the address F000000C(Hex) (S104). This turns the signal CPU_WR_S2 input to the terminal CS of the selector 411 to a high level, and thus switches the signals selected by the selector 411.

As a result of the operations performed in S101 to S104, now the output signal OUT2 from the inverter 707 of the logic circuit 7, the output signal OUTREG17 from the terminal O17 of the output register 3, and the output signal OUT1 from the OR gate 706 of the logic circuit 7 are used respectively as the input signal START1 to the terminal "Start" of the first timer 5, the input signal RESET1 to the terminal "Reset," and the input signal STOP1 to the terminal "Stop."

Moreover, the output signal OUT1 from the OR gate 706 of the logic circuit 7, the output signal OUTREG20 from the terminal O20 of the output register 3, and the output signal OUT2 from the inverter 707 of the logic circuit 7 are used respectively as the input signal START2 to the terminal "Start" of the second timer 6, the input signal RESET2 to the terminal "Reset," and the input signal STOP2 to the terminal "Stop."

Moreover, the external input signal EXT_IN/INT, the output signal OUTREG23 from the terminal O23 of the output register 3, and the output signal OUTREG24 from the terminal O24, the output signal OUTREG25 from the terminal O25, and the output signal OUTREG26 from the terminal O26 are used respectively as the input signals IN1, IN2, and IN3 to the OR gate 701 of the logic circuit 7, the input signal TRG to the inverter 703 and the AND gate 705, and the input signal D_RESET to the terminal R of the flip-flop 702.

Next, the registers Reg0 to Reg3 are set as follows: Reg0=0, Reg1=1, Reg2=0 and Reg3=1(S105). Next, the address to which to make access is set in the selectors 413 to 416 of the connecting circuit 4. Specifically, write access is made to the address F0000010 (Hex) (S106). This turns the signal CPU_WR_S3 input to the terminals CS of the selectors 413 to 416 to a high level, and thus switches the signals selected by the selectors 413 to 416.

Figure 11:
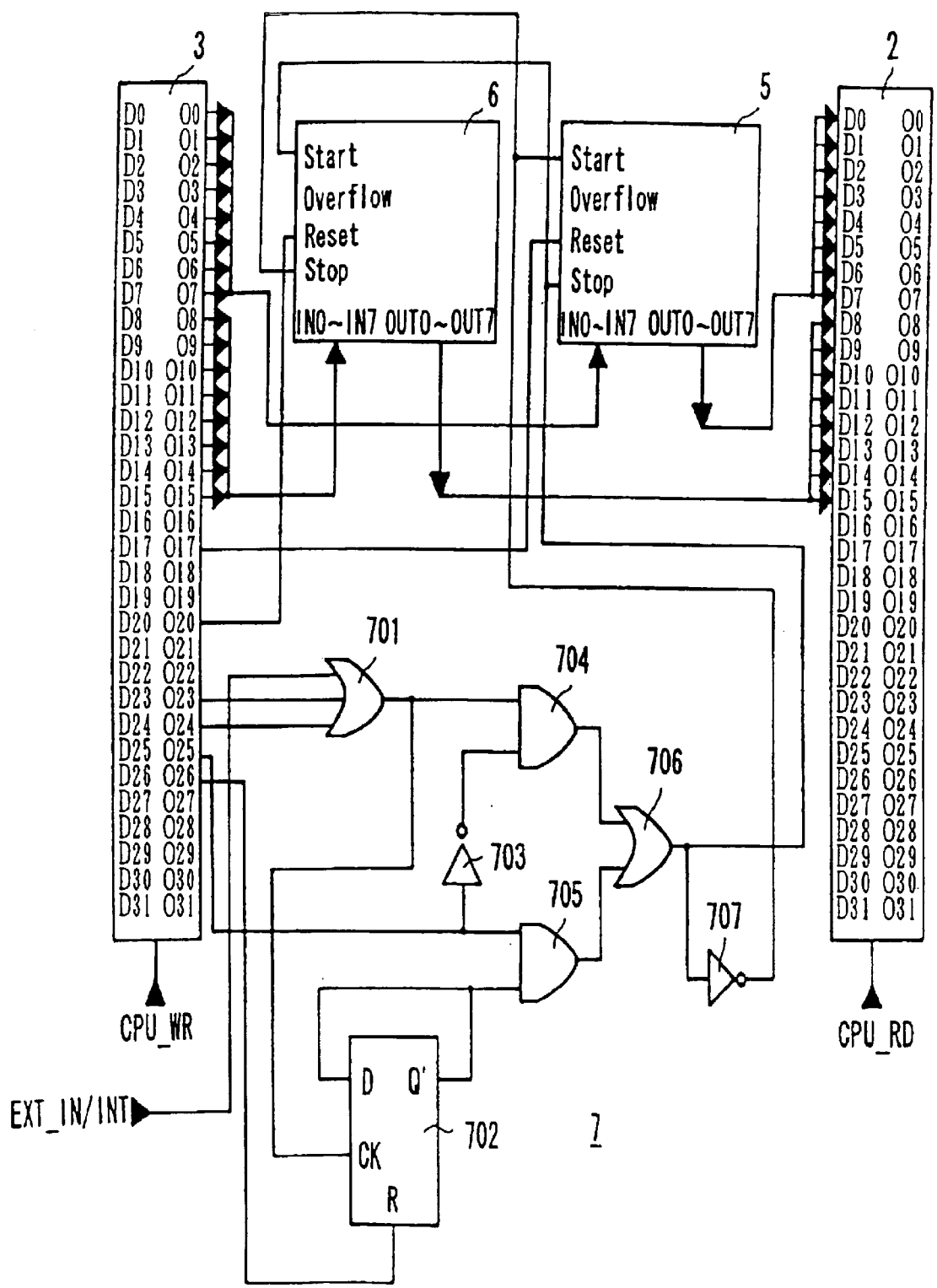
FIG. 11 is a diagram showing the configuration of the peripheral circuits build through execution of the program shown in FIG. 10.

As a result of the operations performed in S105 and S106, now the output signals OUTREG0 to OUTREG7 from the terminals O0 to O7 of the output register 3 are used as the input signals DIN1_0 to DIN1_7 to the terminals IN0 to IN7 of the first timer 5, the output signals OUTREG8 to OUTREG15 from the terminals O8 to O15 of the output register 3 are used as the input signals DIN2_0 to DIN2_7 to the terminals IN0 to IN7 of the second timer 6, the output signals DOUT1_1 to DOUT1_7 from the terminals OUT0 to OUT7 of the first timer 5 are used as the input signals INREG0 to INREG7 to the terminals D0 to D7 of the input register 2, and the output signals DOUT2_1 to DOUT2_7 from the terminals OUT0 to OUT7 of the second timer 6 are used as the input signals INREG8 to INREG15 to the terminals D8 to D15 of the input register 2. Thus, peripheral circuits as shown in FIG. 11 are built.

Next, the values of the registers Reg0 to Reg7 are all set at "1," the values of the registers Reg8 to Reg15 are all set at "1," the value of the register Reg17 is set at "1," the value of the register Reg20 is set at "1," the value of the register R23 is set at "0," the value of the register R24 is set at "0," the value of the register R25 is set at "0," and the value of the register R26 is set at "1" (S107).

Next the address to which to make access is set in the output register 3. Specifically, write access is made to the address F0000004(Hex) (S108). This turns the input signal CPU_WR to the output register 3 to a high level, and thus makes the output register 3 read the signals on the data bus 8.

As a result of the operations performed in S107 and S108, now, in the first and second timers 5 and 6, the inputs to the terminals IN0 to IN7 are all at a high level, the input to the terminal "Reset" is at a high level. Moreover, in the logic circuit 7, the two inputs to the OR gate 701 other than the external input signal EXT_IN are at a low level, the input to the terminal R of the flip-flop 702 is at a high level, and the input to the inverter 703 and one of the inputs to the AND gate 705 are at a high level.

Thus, every time the external input signal EXT_IN/INT rises, the input to the terminal "Start" of the first timer 5 and the input to the terminal "Stop" of the second timer 6 rise. Moreover, every time the external input signal EXT_IN/INT falls, the input to the terminal "Stop" of the first timer 5 and the input to the terminal "Start" of the second timer 6 rise.

However, now, since the input to the terminal "Reset" of the first timer 5 and the input to the terminal "Reset" of the second timer 6 are at a high level, the first and second timers 5 and 6 are in a reset state, and thus do not perform counting.

Figure 12:
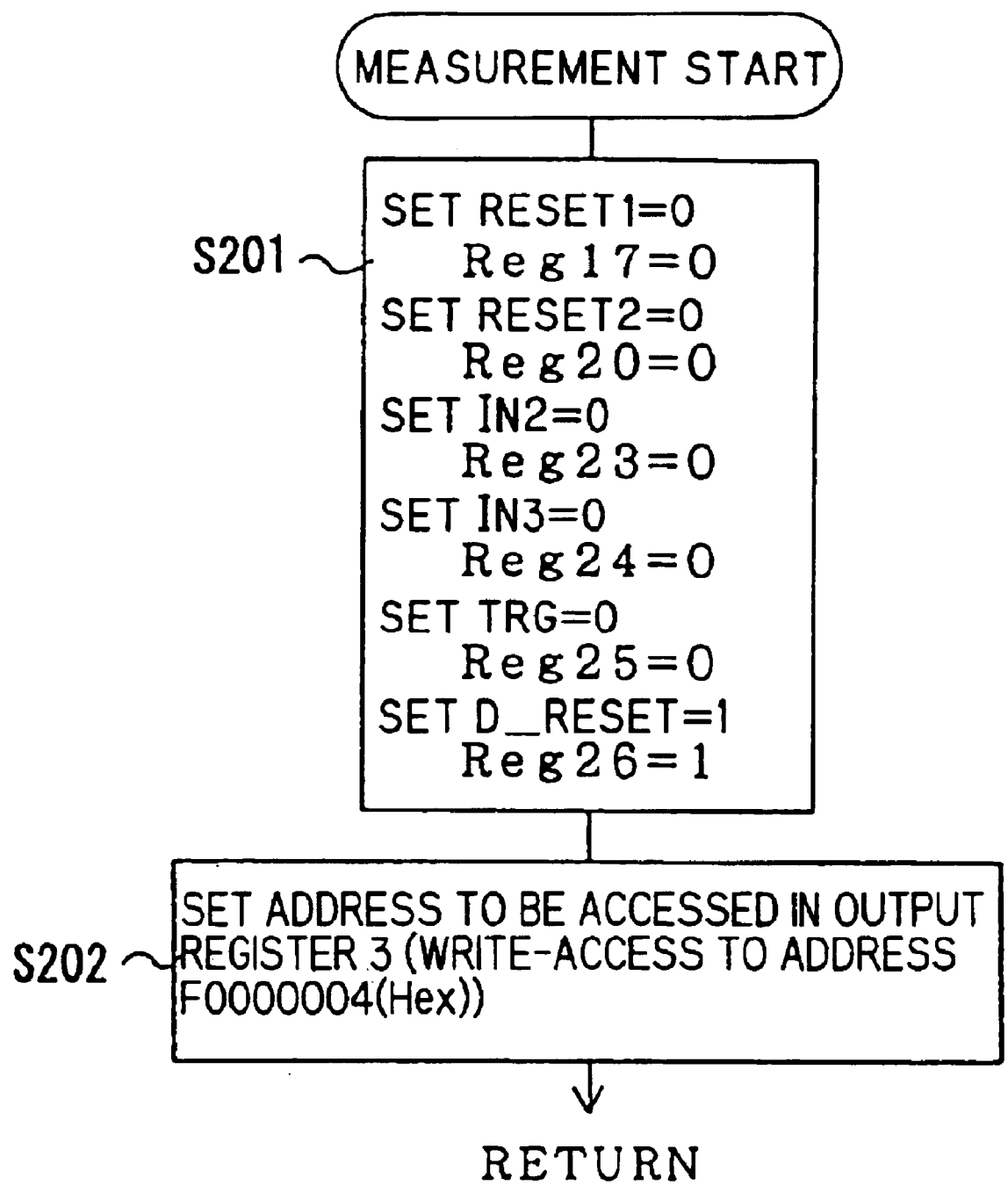
FIG. 12 is a flow chart of an example of the program for controlling the peripheral circuits configured as shown in FIG. 11.

FIG. 12 shows a flow chart of an example of the program for starting the measurement of the high and low periods of the external input signal EXT_IN/INT. First, the value in the register Reg17 is set at "0," the value in the register Reg20 is set at "0," the value in the register Reg23 is set at "0," the value in the register Reg24 is set at "0," the value in the register Reg25 is set at "0," and the value in the register Reg26 is set at "1" (S201). Next, the address to which to make access is set in the output register 3. Specifically, write access is made to the address F0000004 (Hex) (S202).

As a result of these operations, now, in the logic circuit 7, the two inputs to the OR gate 701 other than the external input signal EXT_IN are at a low level, the input to the terminal R of the flip-flop 702 is at a high level, and the input to the inverter 703 and one of the inputs to the AND gate 705 are at a high level. Moreover, the input to the terminals "Reset" of the first and second timers 5 and 6 are at a low level, and thus the first and second timers 5 and 6 recovers from the reset state.

Thus, the first timer 5 is brought into a state in which it starts counting with a count value FF(Hex) on a trailing edge in the external input signal EXT_IN/INT and stops counting on a rising edge in the external input signal EXT_IN/INT. On the other hand, the second timer 6 is brought into a state in which it starts counting with a count value FF(Hex) on a rising edge in the external input signal EXT_IN/INT and stops counting on a trailing edge in the external input signal EXT_IN/INT.

Figure 13:
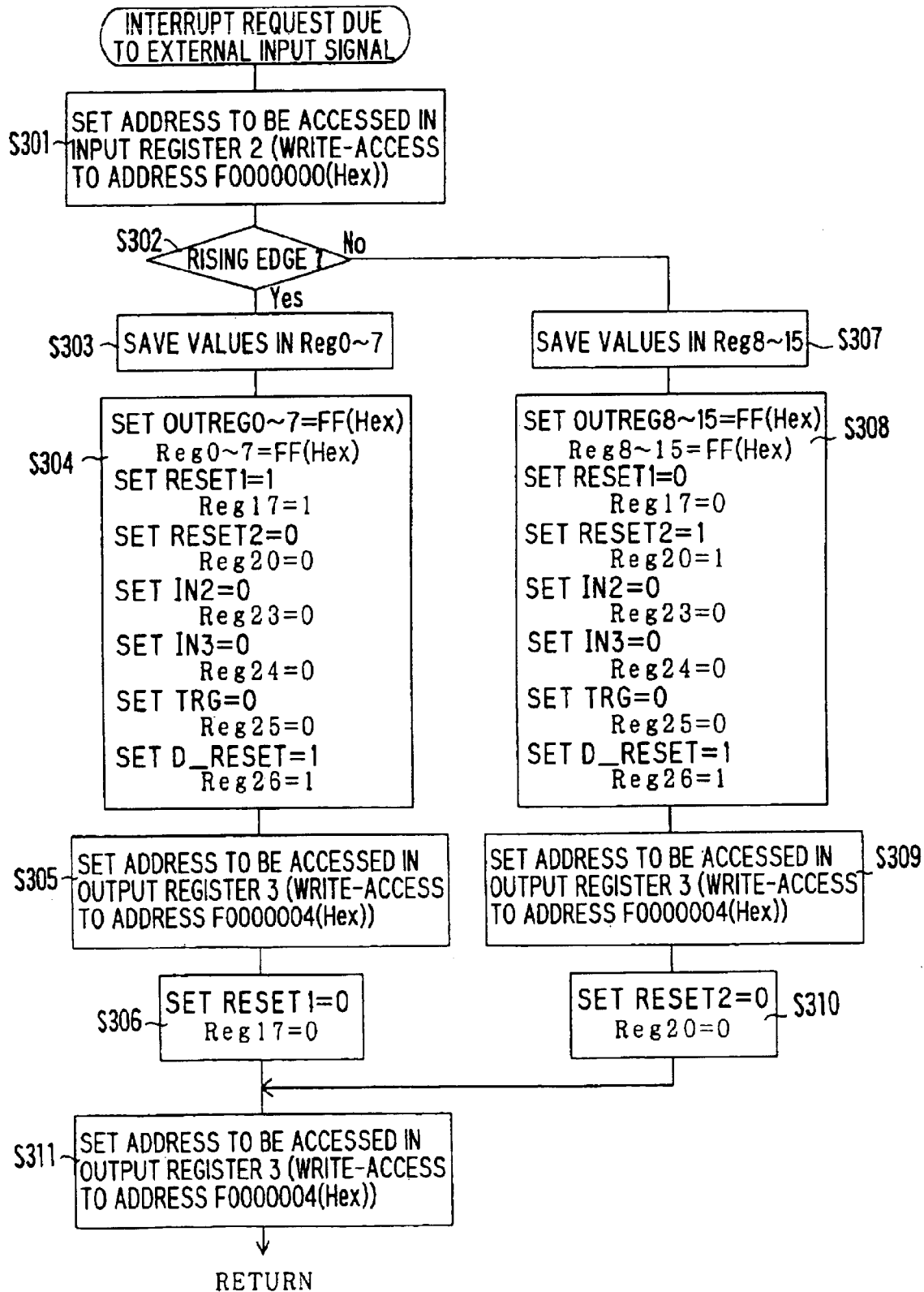
FIG. 13 is a flow chart of another example of the program for controlling the peripheral circuits configured as shown in FIG. 11.

FIG. 13 shows a flow chart of an example of the program executed when an interrupt request occurs on a rising or trailing edge in the external input signal EXT_IN/INT after the measurement of the high and low periods of the external input signal EXT_IN/INT has been started. First, the address to which to make access is set in the input register 2. Specifically, read access is made to the address F0000000 (Hex) (S301). Next, whether the cause of the interrupt request is a rising edge of the external input signal EXT_IN/INT or not is checked (S302).

If, in step S302, a rising edge is recognized ("Yes" in S302), the values in the registers Reg0 to Reg7 are saved in a RAM or the like used when a software procedure is executed (S303). Next, the values in the registers Reg0 to Reg7 are all set at "1," the value in the register Reg17 is set at "1," the value in the register Reg20 is set at "0," the value in the register Reg23 is set at "1," the value in the register Reg24 is set at "0," the value in the register Reg25 is set at "0," and the value in the register Reg26 is set at "1" (S304).

Next, the address to which to make access is set in the output register 3. Specifically, write access is made to the address F0000004(Hex) (S305). Next, the value in the register Reg17 is set at "0" (S306). Next, the address to which to make access is set in the output register 3 (S311).

By contrast, if, in S302, a rising edge is not recognized ("No" in S302), the values in the registers Rge8 to Reg15 are saved in a RAM or the like used when a software procedure is executed (S307). Next, the values in the registers Reg8 to Reg15 are all set at "1," the value in the register Reg17 is set at "0," the value in the register Reg20 is set at "1," the value in the register Reg23 is set at "0," the value in the register Reg24 is set at "0," the value in the register Reg25 is set at "0," and the value in the register Reg26 is set at "1" (S308).

Next, the address to which to make access is set in the output register 3. Specifically, write access is made to the address F0000004(Hex) (S309). Next, the value in the register Reg20 is set at "0" (S310). Next, the address to which to make access is set in the output register 3 (S311).

Figure 14:
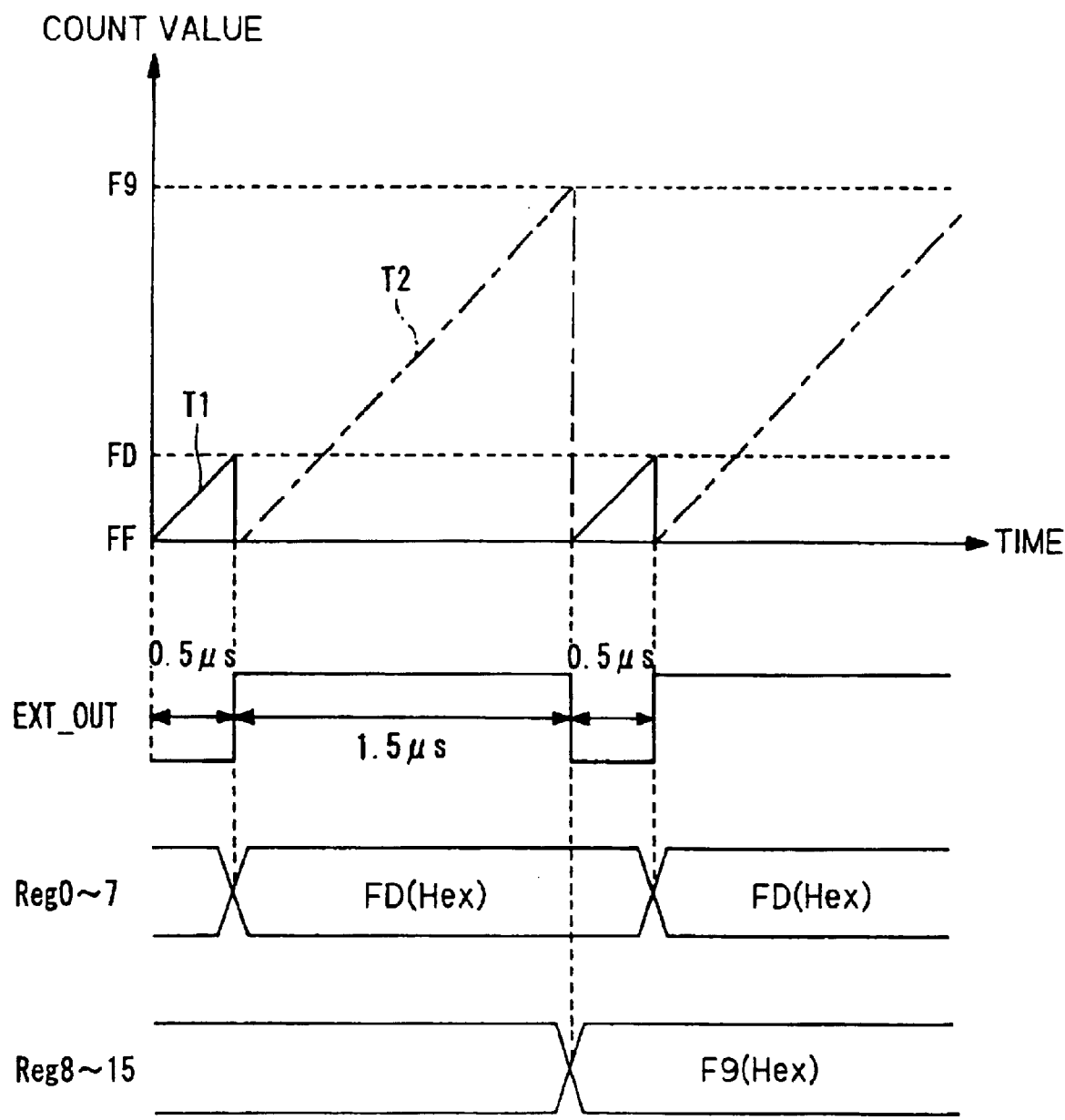
FIG. 14 is a diagram illustrating the operation of the peripheral circuits configured as shown in FIG. 11.

As the programs described above are executed, the count value T1 of the first timer 5, the count value T2 of the second timer 6, and the values in the registers Reg0 to Reg7 and in the registers Reg8 to Reg15 vary as shown in FIG. 14 according to the external input signal EXT_IN/INT. Here, it is assumed that the low period of the external input signal EXT_IN/INT is 0.5 [$\mu$s], the high period thereof is 1.5 [$\mu$s], and the first and second timers 5 and 6 operate on a clock signal having a frequency of 4 [MHz].

Specifically, when the external input signal EXT_IN/INT rises, the count value T1 of the first timer 5 is stored in the registers Reg0 to Reg7, then the values in the registers Reg0 to Reg7 are saved, and then the first timer 5 is reset momentarily so that its count value T1 is set at FF(Hex). Here, on the rising edge of the external input signal EXT_IN/INT, the first timer 5 stops counting, and the second timer 6 starts counting with a count value FF(Hex).

By contrast, when the external input signal EXT_IN/INT falls, the count value T2 of the second timer 6 is stored in the registers Reg8 to Reg15, then the values in the registers Reg8 to Reg15 are saved, and then the second timer 6 is reset momentarily so that its count value T2 is set at FF(Hex). Here, on the trailing edge of the external input signal EXT_IN/INT, the second timer 6 stops counting, and the first timer 5 starts counting with a count value FF(Hex).

In the operations described above, the values saved when the external input signal EXT_IN/INT rises is the low period, and the values saved when external input signal EXT_IN/INT falls is the high period.

As described above, in the microcomputer of this embodiment, by interconnecting individual basic peripheral circuits (i.e. the first timer 5, the second timer 6, and the logic circuit 7) with the connecting circuit 4 through execution of a program, it is possible to realize a function of measuring the high and low periods of the external input signal EXT_IN.

Here, two timers are used to measure the high and low periods of the external input signal EXT_IN, but these two timers are controlled by a single input port having an interrupt function. That is, there is no need to use a plurality of input ports for the measurement of a single signal.

Figure 21:
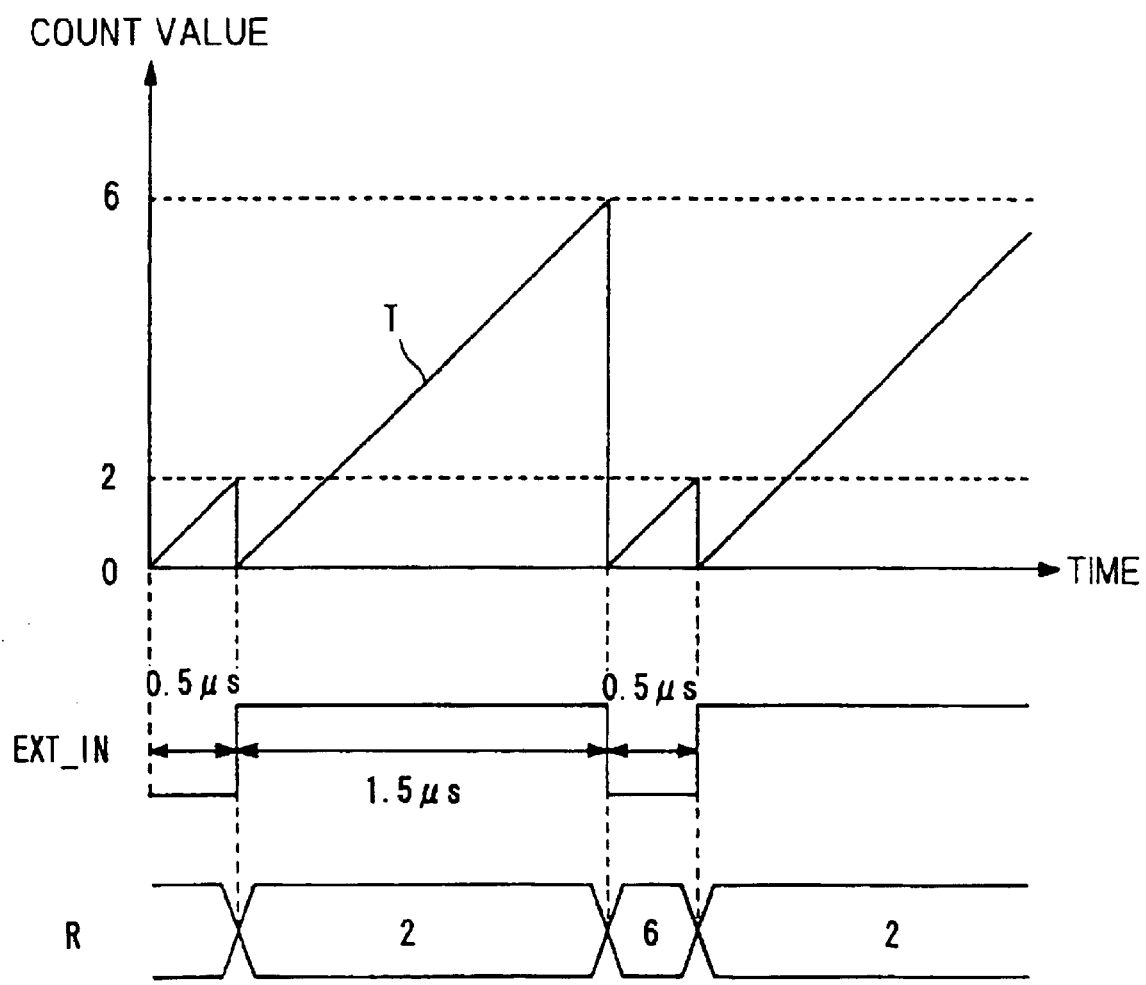
FIG. 21 is a diagram illustrating an example of the operation for measuring the high and low periods of an external input signal according to prior art.
Figure 22:
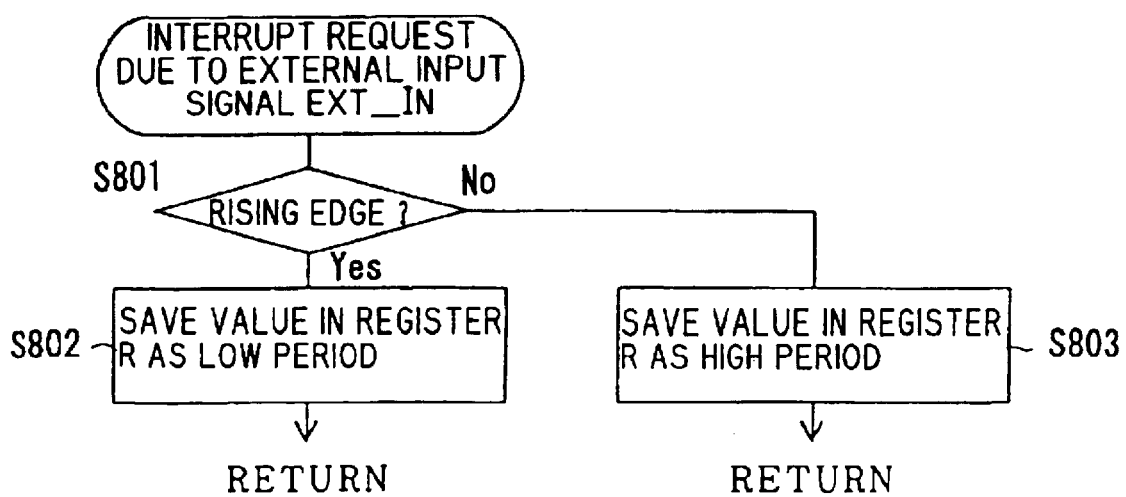
FIG. 22 is a flow chart of an example of the program required by the operation shown in FIG. 21.
Figure 23:
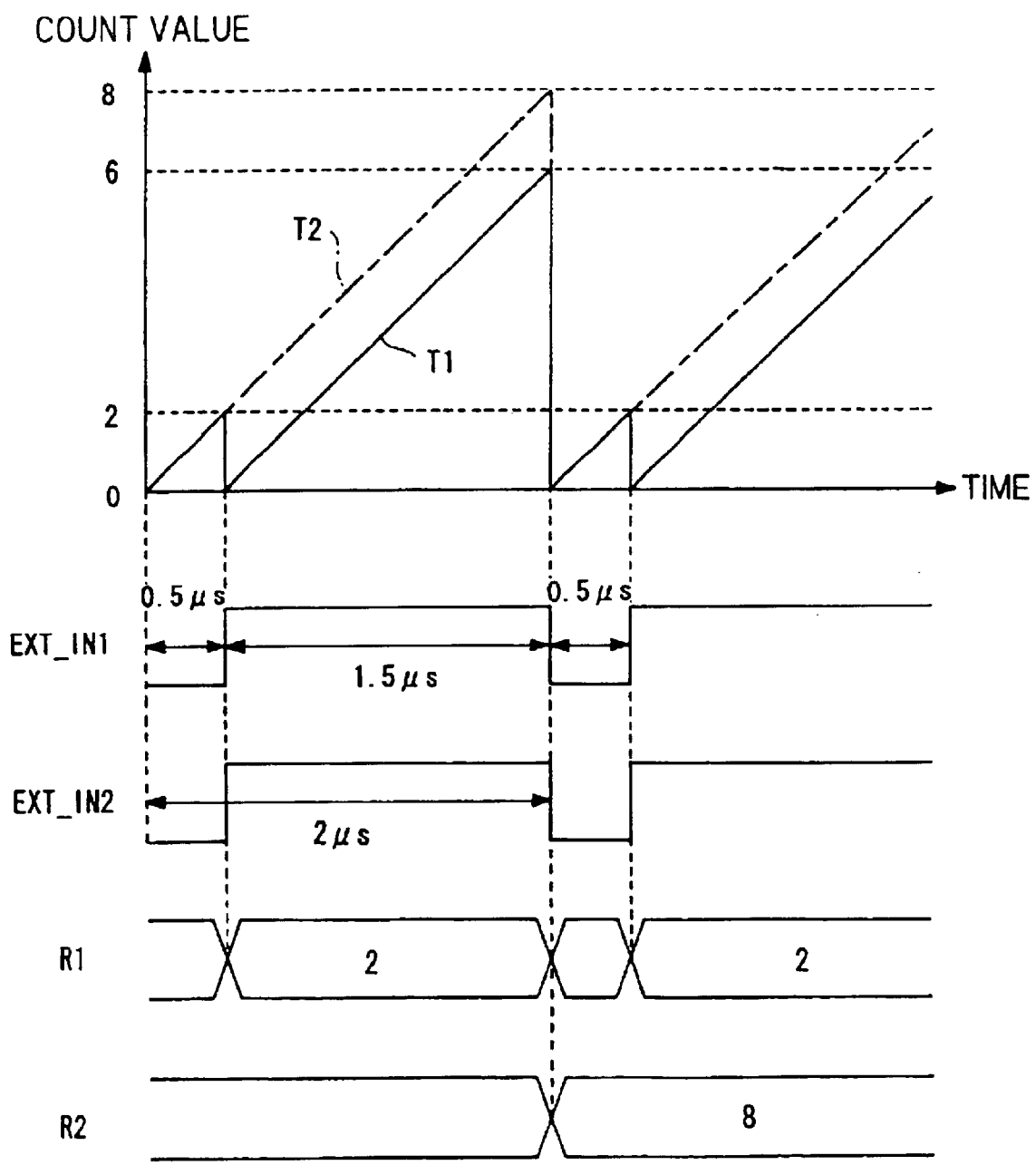
FIG. 23 is a diagram illustrating another example of the operation for measuring the high and low periods of an external input signal according to prior art.
Figure 24:
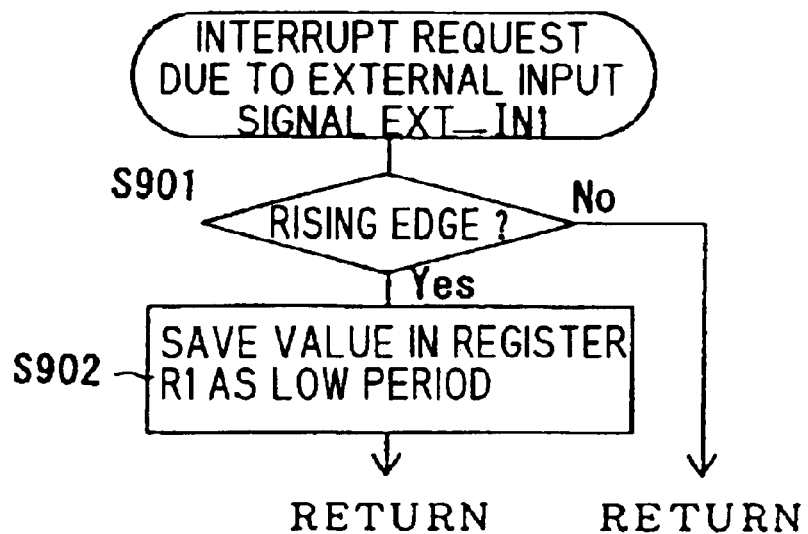
FIG. 24 is a flow chart of an example of the program required by the operation shown in FIG. 23.
Figure 25:
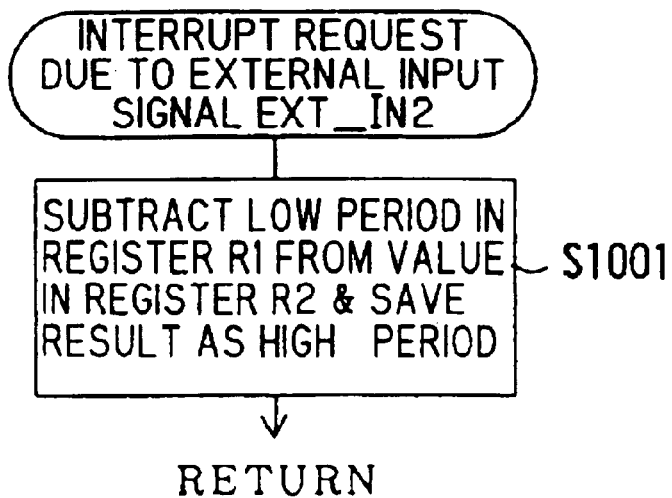
FIG. 25 is a flow chart of another example of the program required by the operation shown in FIG. 23.

Moreover, as compared with the prior art described earlier with reference to FIG. 21, there is a lower risk of a measurement result stored in the registers being destroyed by being overwritten with the next measurement result because of shortage of processing time, as far as similar microprocessor processing is concerned. As will be clear from these two points, it is possible to build peripheral circuits having intelligent functions without minimum redundancy comparable to the peripheral circuits of a microcomputer designed for a special purpose.

Figure 15:
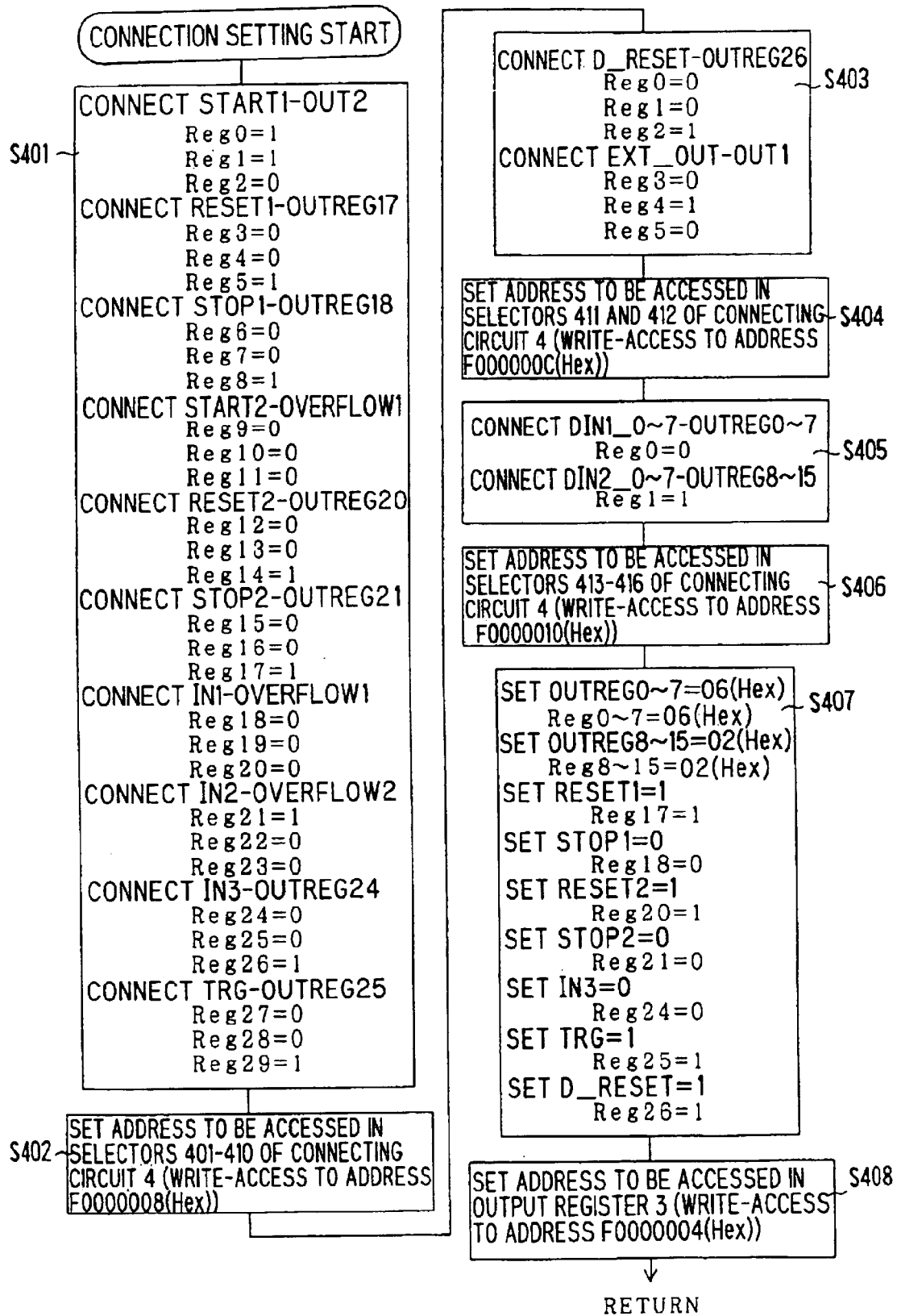
FIG. 15 is a flow chart of another example of a program for building peripheral circuits having predetermined functions.

FIG. 15 shows a flow chart of another example of the program for building peripheral circuits having predetermined functions. First, the registers Reg0 to Reg29 are set as follows: Reg0=1, Reg1=1, Reg2=0, Reg3=0, Reg4=0, Reg5=1, Reg6=0, Reg7=0 Reg8=1, Reg9=0, Reg10=0, Reg11=0, Reg12=0, Reg13=0, Reg14=1, Reg15=0, Reg16=0, Reg17=1, Reg18=0, Reg19=0, Reg20=0, Reg21=1, Reg22=0, Reg23=0, Reg24=0, Reg25=0, Reg26=1, Reg27=0, Reg28=0, and Reg29=1 (S401).

Next, the address to which to make access is set in the selectors 401 to 410 of the connecting circuit 4. Specifically, write access is made to the address F0000008(Hex) (S402). This turns the signal CPU_WR_S1 input to the terminals CS of the selectors 401 to 410 to a high level, and thus switches the signals selected by the selectors 401 to 410.

Next, the registers Reg0 to Reg5 are set as follows: Reg0=0, Reg1=0, Reg2=1, Reg3=0, Reg4=1, and Reg5=0 (S403). Next, the address to which to make access is set in the selectors 411 and 412 of the connecting circuit 4. Specifically, write access is made to the address F000000C (Hex) (S404). This turns the signal CPU_WR_S2 input to the terminals CS of the selectors 411 and 412 to a high level, and thus switches the signals selected by the selectors 411 and 412.

As a result of the operations performed in S401 to 404, now, the output signal OUT2 from the inverter 707 of the logic circuit 7 and the output signals OUTREG17 and OUTREG18 from the terminals O17 and O18 of the output register 3 are used respectively as the input signal START1 to the terminal "Start" of the first timer 5, the input signal RESET1 to the terminal "Reset," and the input signal STOP1 to the terminal "Stop."

Moreover, the output signal OVERFLOW1 from the terminal "Overflow" of the first timer 5, the output signal OUTREG20 from the terminal O20 of the output register 3, and the output signal OUTREG21 from the terminal O21 are used respectively as the input signal START2 to the terminal "Start" of the second timer 6, the input signal RESET2 to the terminal "Reset," and the input signal STOP2 to the terminal "Stop."

Moreover, the output signal OVERFLOW1 from the terminal "Overflow" of the first timer 5, the output signal OVERFLOW2 from the terminal "Overflow" of the second timer 6, the output signal OUTREG24 from the terminal O24 of the output register 3, the output signal OUTREG25 from the terminal O25, and the output signal OUTREG26 from the terminal O26 are used respectively as the input signals IN1, IN2, and IN3 to the OR gate 701 of the logic circuit 7, the input signal TRG to the inverter 703 and the AND gate 705, and the input signal D_RESET to the terminal R of the flip-flop 702. Moreover, the output signal OUT1 from the OR gate 706 of the logic circuit 7 is used as the external output signal EXT_OUT.

Next, the registers Reg0 and Reg1 are set as follows: Reg0=0 and Reg1=1 (S405). Next, the address to which to make access is set in the selectors 413 to 416 of the connecting circuit 4. Specifically, write access is made to the address F0000010(Hex) (S406). This turns the signal CPU_WR_3 input to the terminals CS of the selectors 413 to 416 to a high level, and thus switches the signals selected by the selectors 413 to 416.

Figure 16:
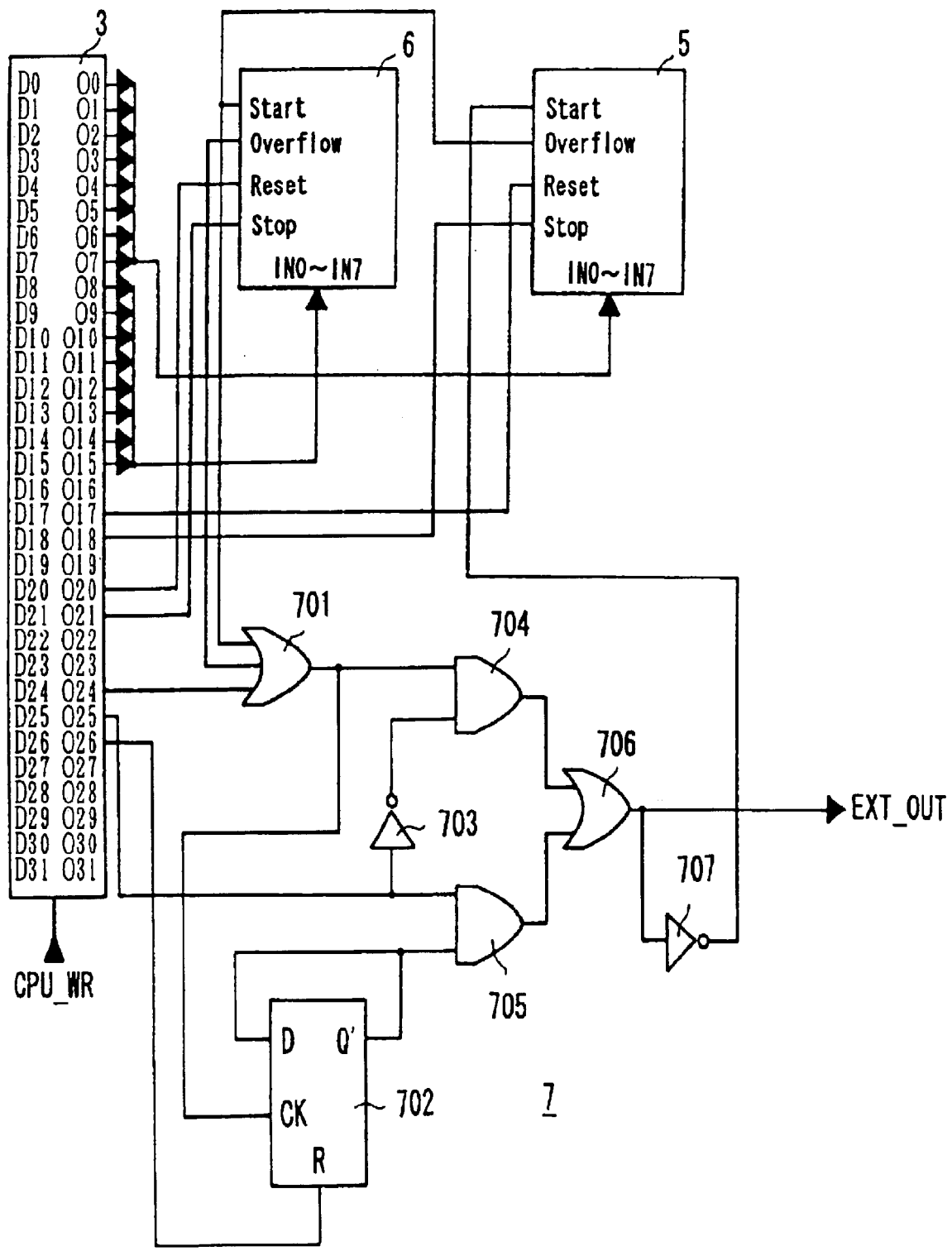
FIG. 16 is a diagram showing the configuration of the peripheral circuits build through execution of the program shown in FIG. 15.

As a result of the operations performed in S405 and S406, now, the output signals OUTREG0 to OUTREG7 from the terminals O0 to O7 of the output register 3 are used as the input signals DIN1_0 to DIN1_7 to the terminals IN0 to IN7 of the first timer 5 and the output signals OUTREG8 to OUTREG15 from the terminals O8 to O15 of the output register 3 are used as the input signal DIN2_0 to DIN2_7 to the terminal IN0 to IN7 of the second timer 6. Thus, peripheral circuits as shown in FIG. 16 are built.

Next, the values in the registers Reg0 to Reg7 are set at 06(Hex), the values in the registers Reg8 to Reg15 are set at 02(Hex), the value in the register Reg17 is set at "1," the value in register Reg18 is set at "0," the value in register Reg20 is set at "1," the value in register Reg21 is set at "0," the value in register Reg24 is set at "0," the value in register Reg25 is set at "1," and the value in register Reg26 is set at "1" (S407).

Next, the address to which to make access is set in the output register 3. Specifically, write access is made to the address F0000004(Hex) (S408). This turns the input signal CPU_WR to the output register 3 into a high level, and thus makes the output register 3 read the signals on the data bus 8.

As a result of the operations performed in S407 to S408, with the first and second timers 5 and 6 receiving, at their terminals IN0 to IN7, values 06(Hex) and 02(Hex) respectively, the inputs to their terminals "Reset" turn to a high level. Moreover, now, in the logic circuit 7, the three inputs to the OR gate 701 are all at a low level, the input to the terminal R of the flip-flop 702 is at a high level, and the input to the inverter 703 and one of the inputs to the AND gate 705 are at a high level. Thus, the first and second timers 5 and 6 are in a reset state, with their count values set at 06(Hex) and 02(Hex) respectively. Moreover, the external output signal EXT_OUT is kept at a high level.

Figure 17:
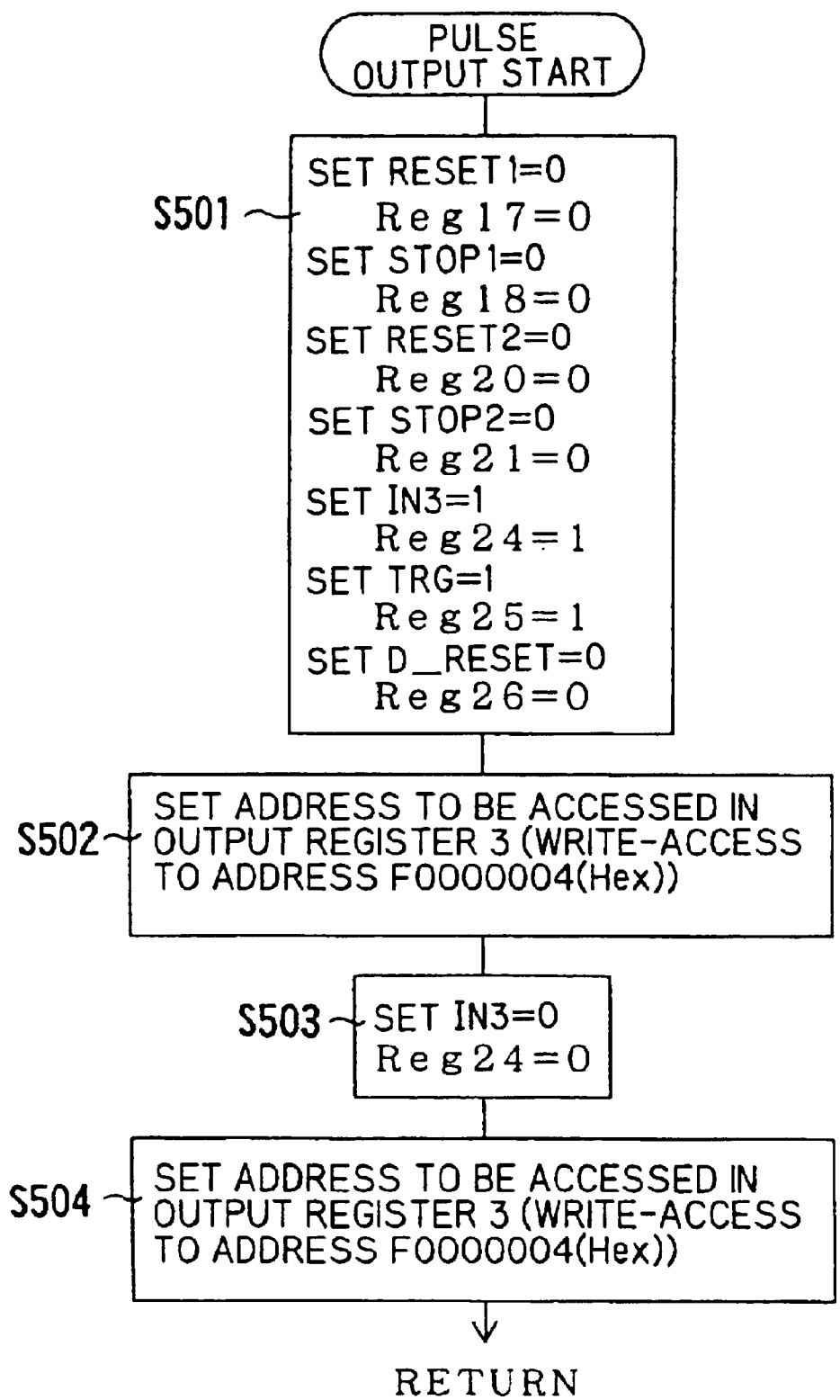
FIG. 17 is a flow chart of an example of the program for controlling the peripheral circuits configured as shown in FIG. 16.

FIG. 17 shows a flow chart of an example of the program for starting the output of pulses having predetermined high and low periods as the external output signal EXT_OUT. First, the value in the register Reg17 is set at "0," the value in the register Reg18 is set at "0," the value in the register Reg20 is set at "0," the value in the register Reg21 is set at "0," the value in the register Reg24 is set at "1," the value in the register Reg25 is set at "1," and the value in the register Reg26 is set at "0" (S501).

Next, the address to which to make access is set in the output register 3. Specifically, write access is made to the address F0000004(Hex) (S502). Next, the value in the register Reg24 is set at "0" (S503). Next, the address to which to make access is set in the output register 3 (S504).

As a result of these operations, the inputs to the terminals "Reset" of the first and second timers 5 and 6 are inverted to a low level, and thus the first and second timers 5 and 6 recover from the reset state. Moreover, in the logic circuit 7, one of the inputs to the OR gate 701 is inverted to a high level and then back to a low level, and in addition the input to the terminal R of the flip-flop 702 is inverted to a low level. Thus, the external output signal EXT_OUT is inverted to a low level. In addition, the input to the "Start" of the first timer 5 is inverted to a high level, and this makes the first timer 5 start counting with a count value 06(Hex).

Thereafter, when an overflow occurs in the count value of the first timer 5, the output from the terminal "Overflow" of the first timer 5 is inverted to a high level, and the input to the terminal "Start" of the second timer 6 and one of the inputs to the OR gate 701 of the logic circuit 7 are inverted to a high level. Thus, the second timer 6 starts counting with a count value 02(Hex). In addition, the external output signal EXT_OUT is inverted to a high level and the input to the terminal "Start" of the first timer 5 is inverted to a low level.

Figure 18:
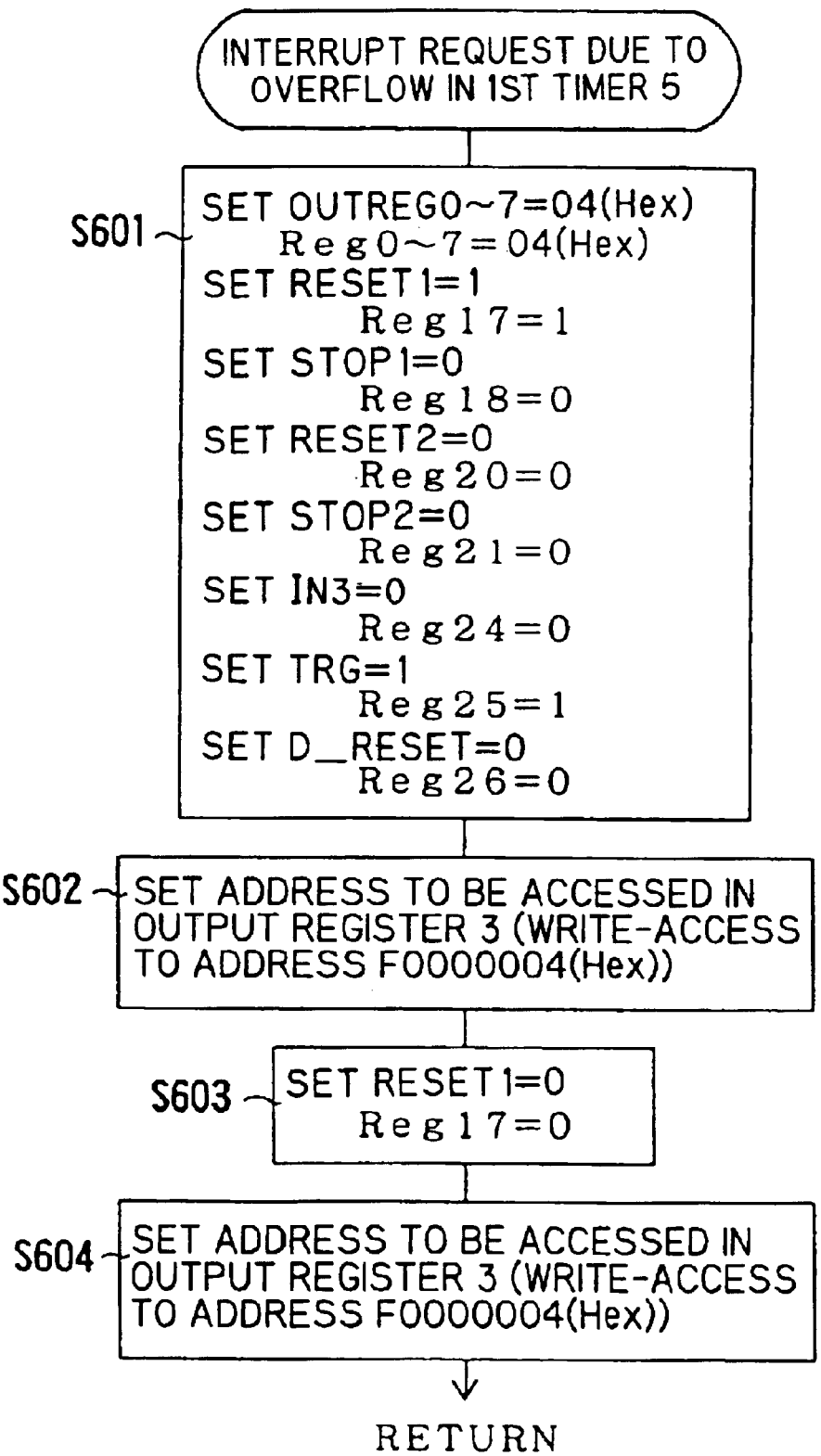
FIG. 18 is a flow chart of another example of the program for controlling the peripheral circuits configured as shown in FIG. 16.

The overflow in the first timer 5 causes an interrupt request. On occurrence of this interrupt request, a program as shown in a flow chart in FIG. 18 is executed. First, the values in the registers Reg0 to Reg7 are set at 04(Hex), the value in the register Reg17 is set at "1," the value in the register Reg18 is set at "0," the value in the register Reg20 is set at "0," the value in the register Reg21 is set at "0," the value in the register Reg24 is set at "0," the value in the register Reg25 is set at "1," the value in the register Reg26 is set at "0" (S601).

Next, the address to which to make access is set in the output register 3. Specifically, write access is made to the address F0000004(Hex) (S602). Next, the value in the register Reg17 is set at "0" (S603). Next, the address to which to make access is set in the output register 3 (S604).

As a result of these operations, in the first timer 5, with the value input to the terminals IN0 to IN7 kept at 04(Hex), the input to the terminal "Reset" turns to a high level and then back to a low level. Thus, the first timer 5 is reset momentarily, so that its count value is set at 04(Hex). In addition, the output from the terminal "Overflow" of the first timer 5 is inverted to a low level, and this turns all the three inputs to the OR gate 701 of the logic circuit 7 to a low level.

Thereafter, when an overflow occurs in the count value of the second timer 6, the output from the terminal "Overflow" of the second timer 6 is inverted to a high level, and one of the inputs to the OR gate 701 of the logic circuit 7 is inverted to a high level. As a result, the external output signal EXT_OUT is inverted to a low level. In addition, the input to the terminal "Start" of the first timer 5 is inverted to a high level, and this makes the first timer 5 start counting with a count value 04 (Hex).

Figure 19:
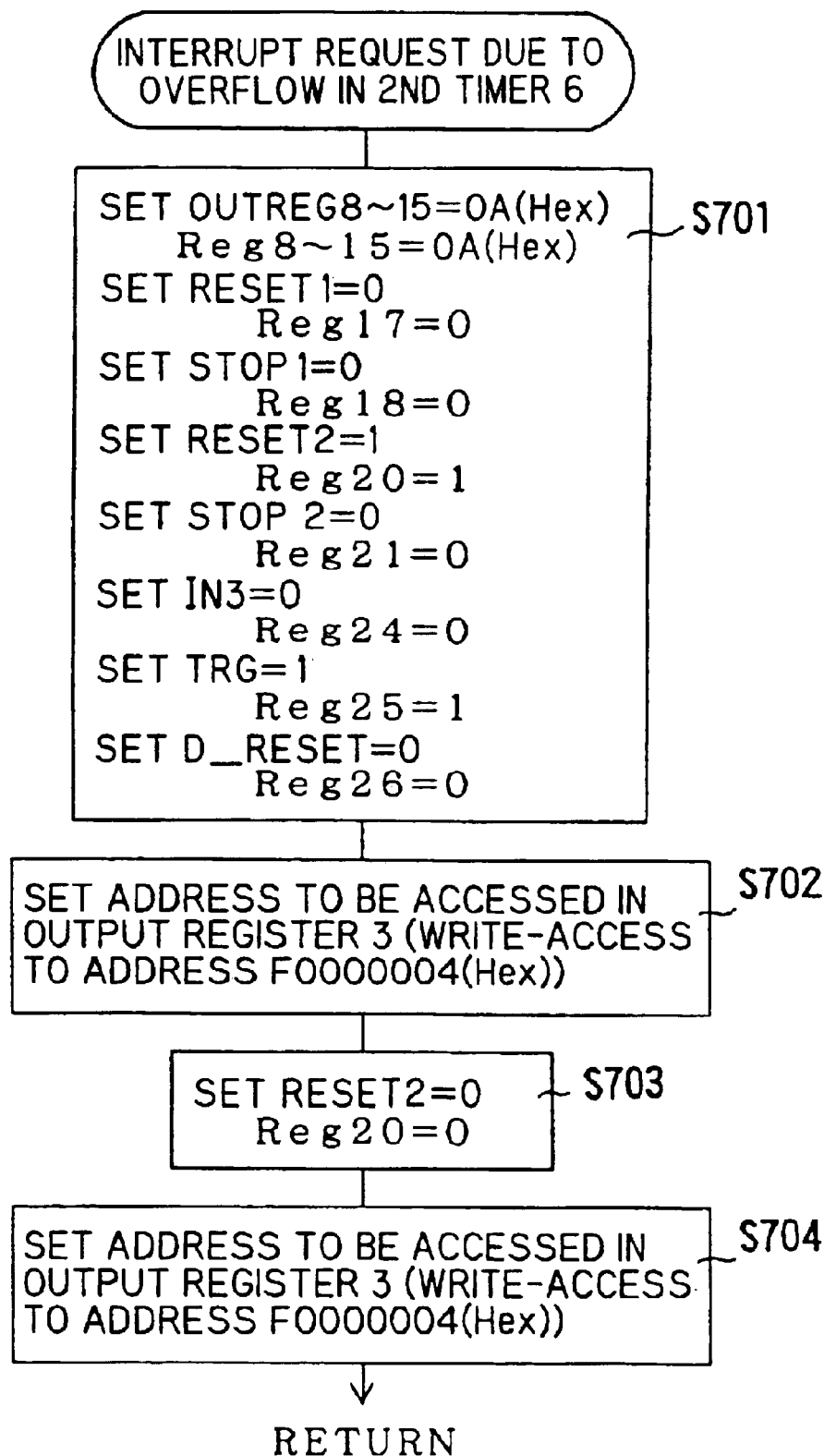
FIG. 19 is a flow chart of still another example of the program for controlling the peripheral circuits configured as shown in FIG. 16.

The overflow in the second timer 6 causes an interrupt request. On occurrence of this interrupt request, a program as shown in a flow chart in FIG. 19 is executed. First, the values in the registers Reg8 to Reg5 are set at 0A(Hex), the value in the register Reg17 is set at "0," the value in the register Reg18 is set at "0," the value in the register Reg20 is set at "1," the value in the register Reg21 is set at "0," the value in the register Reg24 is set at "0," the value in the register Reg25 is set at "1," the value in the register Reg26 is set at "0" (S701).

Next, the address to which to make access is set in the output register 3. Specifically, write access is made to the address F0000004(Hex) (S702). Next, the value in the register Reg20 is set at "0" (S703). Next, the address to which to make access is set in the output register 3 (S704).

As a result of these operations, in the second timer 6, with the value input to the terminals IN0 to IN7 kept at 0A(Hex), the input to the terminal "Reset" turns to a high level and then back to a low level. Thus, the second timer 6 is reset momentarily, so that its count value is set at 0A(Hex). In addition, the output from the terminal "Overflow" of the second timer 6 is inverted to a low level, and this turns all the three inputs to the OR gate 701 of the logic circuit 7 to a low level.

Figure 20:
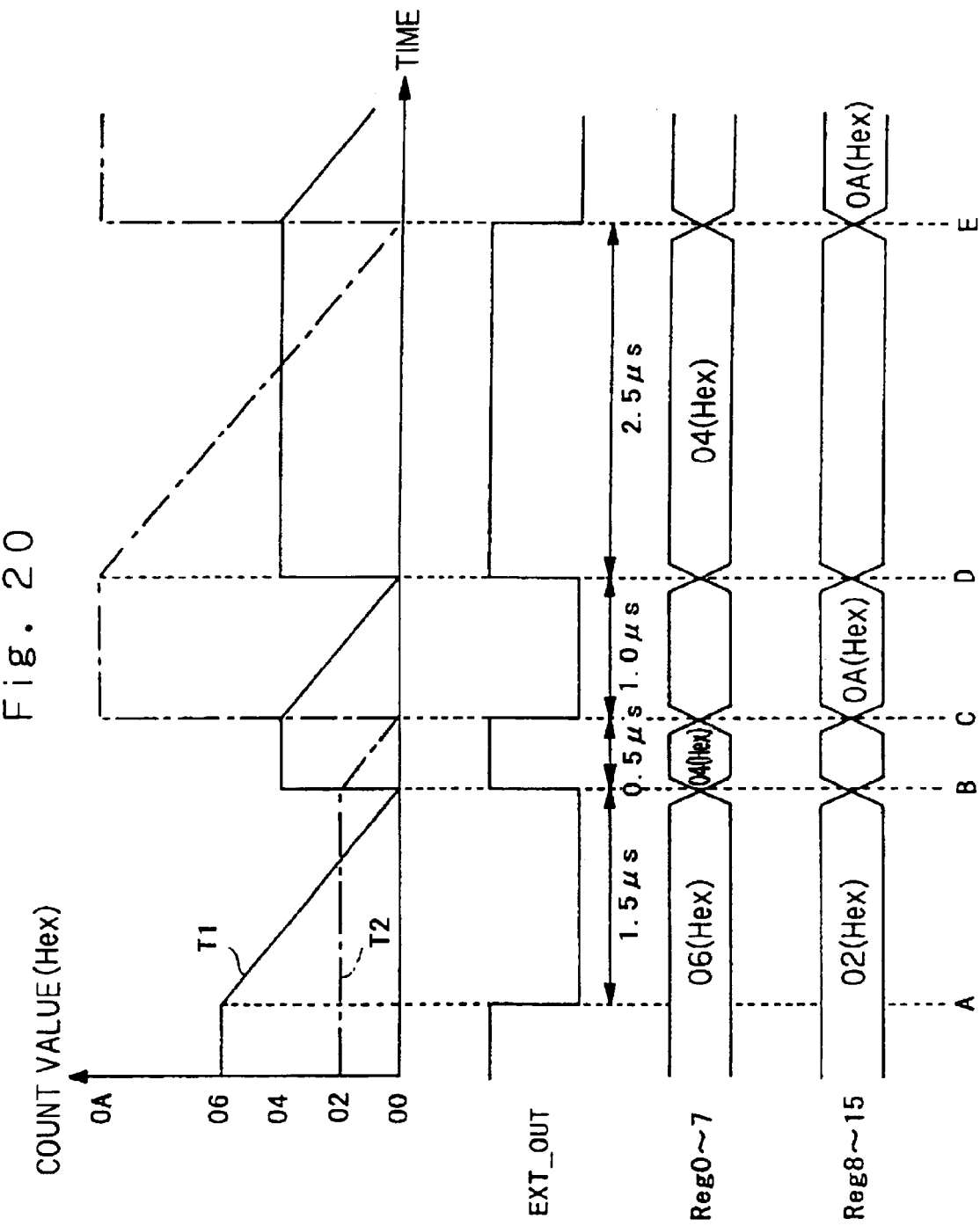
FIG. 20 is a diagram illustrating the operation of the peripheral circuits configured as shown in FIG. 16.

As the programs described above are executed, the count value T1 of the first timer 5, the count value T2 of the second timer 6, the values in the registers Reg0 to Reg7, the values in the registers Reg8 to Reg15, and the external output signal EXT_OUT vary as shown in FIG. 20. Here, it is assumed that the first and second timers 5 and 6 operate on a clock signal having a frequency of 4 [MHz].

First, in the initial state where the program shown in FIG. 15 has just been executed, the external output signal EXT_OUT is kept at a high level. Moreover, the first and second timers 5 and 6 are in a reset state, with their count values set at 06(Hex) and 02(Hex) respectively. When the program shown in FIG. 17 is executed, as the letter "A" indicates in FIG. 20, the external output signal EXT_OUT is inverted to a low level, and the first timer 5 starts counting with a count value 06 (Hex).

A period of 1.5 [µs] thereafter, an overflow occurs in the first timer 5. Thus, the program shown in FIG. 18 is executed, and as a result, as the letter "B" indicates in FIG. 20, the external output signal EXT_OUT is inverted to a high level. Moreover, the second timer 6 starts counting with a count value 02(Hex). In addition, the first timer 5 is reset, and its count value is set at 04(Hex).

A period of 0.5 [µs] thereafter, an overflow occurs in the second timer 6. Thus, the program shown in FIG. 19 is executed, and as a result, as the letter "C" indicates in FIG. 20, the external output signal EXT_OUT is inverted to a low level. Moreover, the first timer 5 starts counting with a count value 04(Hex). In addition, the second timer 6 is reset, and its count value is set at 0A(Hex).

A period of 1.0 [µs] thereafter, an overflow occurs in the first timer 5. Thus, the program shown in FIG. 18 is executed, and as a result, as the letter "D" indicates in FIG. 20, the external output signal EXT_OUT is inverted to a high level. Moreover, the second timer 6 starts counting with a count value 0A(Hex). In addition, the first timer 5 is reset, and its count value is set at 04(Hex).

A period of 2.5 [µs] thereafter, an overflow occurs in the second timer 6. Thus, the program shown in FIG. 19 is executed, and as a result, as the letter "E" indicates in FIG. 20, the external output signal EXT_OUT is inverted to a low level. Moreover, the first timer 5 starts counting with a count value 04(Hex). In addition, the second timer 6 is reset, and its count value is set at 0A(Hex).

As described above, in the microcomputer of this embodiment, by interconnecting individual basic peripheral circuits (i.e. the first timer 5, the second timer 6, and the logic circuit 7) with the connecting circuit 4 through execution of a program, it is possible to produce pulses having the desired high and low periods as an external output signal EXT_OUT.

In this embodiment, as basic peripheral circuits are provided the first timer 5, the second timer 6, and the logic circuit 7. However, it is also possible to replace them with other general-purpose peripheral circuits, or add other peripheral circuits. Moreover, modifications are possible with respect to the number of the circuits that read/write data from/to the peripheral circuits, the bit length, the form of address mapping, etc. Moreover, modifications are possible also with respect to the method of selecting inputs/outputs to/from the peripheral circuits by the use of the connecting circuit, for example the number and proportion of input/output terminals combined, the form of address mapping, the bits set, etc.

What is claimed is:

1. A microcomputer comprising:
    a program for operating the microcomputer;
    a plurality of peripheral circuits, each having an individual function and functioning interactively with each other; and
    a connecting circuit connected to the peripheral circuits and comprising a plurality of selectors that select one from among a plurality of input signals and then output the selected input signal to the peripheral circuits according to data given by the program,
    wherein the plurality of peripheral circuits includes an output register that, according to commands included in the program, latches and stores the data temporarily, and thereafter outputs the data to the connecting circuit;

a predetermined selector is selected by the program and the data is fed from the output register to the selected selector so that a signal to be outputted to the peripheral circuits is selected from among the plurality of input signals; and thereby, interconnection among the plurality of peripheral circuits is changed.

2. A microcomputer as claimed in claim 1, wherein the plurality of peripheral circuits includes an input register that, according to the commands included in the program, latches and stores temporarily the data to be outputted from the peripheral circuits and thereafter outputs the data so that the data is taken into the microcomputer.

3. A microcomputer as claimed in claim 1, wherein the plurality of peripheral circuits includes a logic circuit for inputting an external signal to the peripheral circuits.

4. A microcomputer as claimed in claim 3, wherein the peripheral circuits to which the external signal is inputted is a timer f or measuring periods for which the external signal remains at a high level and a low level respectively.

5. A microcomputer as claimed in claim 3, wherein the peripheral circuits to which the external signal is inputted include a first timer that starts counting on a trailing edge of the external signal and stops counting on a rising edge thereof subsequent to the trailing edge and a second timer that starts counting on a rising edge of the external signal and stops counting on a trailing edge thereof subsequent to the rising edge.

6. A microcomputer as claimed in claim 1, wherein the plurality of peripheral circuits includes a logic circuit for outputting externally a signal generated within the peripheral circuits.

7. A microcomputer as claimed in claim 6, wherein the plurality of peripheral circuits for generating the signal to be outputted externally includes a first timer and a second timer and generates a signal having a high level for a predetermined period and a low level for another predetermined period by changing said interconnection by way of the connecting circuit.

\* \* \* \* \*